(12) United States Patent
Zöllner et al.

(10) Patent No.: US 8,802,777 B2
(45) Date of Patent: *Aug. 12, 2014

(54) THERMALLY CROSSLINKING POLYACRYLATES AND METHOD FOR PRODUCING THE SAME

(75) Inventors: Stephan Zöllner, Buchholz/Nordheide (DE); Kay Brandes, Otter (DE); Sven Hansen, Hamburg (DE); Esther Von Possel, Hamburg (DE)

(73) Assignee: tesa SE, Hamburg (DE)

( * ) Notice: Subject to any disclaimer, the term of this patent is extended or adjusted under 35 U.S.C. 154(b) by 516 days.

This patent is subject to a terminal disclaimer.

(21) Appl. No.: 12/529,667

(22) PCT Filed: Mar. 18, 2008

(86) PCT No.: PCT/EP2008/053229
§ 371 (c)(1),
(2), (4) Date: Oct. 12, 2009

(87) PCT Pub. No.: WO2008/122489
PCT Pub. Date: Oct. 16, 2008

(65) Prior Publication Data
US 2010/0104864 A1    Apr. 29, 2010

(30) Foreign Application Priority Data
Apr. 5, 2007   (DE) .................... 10 2007 016 950

(51) Int. Cl.
*C08L 33/02* (2006.01)
*C08L 33/14* (2006.01)

(52) U.S. Cl.
USPC ........... 525/119; 525/116; 525/117; 525/118; 525/207; 525/208

(58) Field of Classification Search
None
See application file for complete search history.

(56) References Cited

U.S. PATENT DOCUMENTS

| | | | |
|---|---|---|---|
| 3,792,011 A * | 2/1974 | Smith et al. | 523/427 |
| 3,954,898 A * | 5/1976 | Hirota et al. | 525/119 |
| 4,051,195 A * | 9/1977 | McWhorter | 528/106 |
| 4,525,104 A | 6/1985 | Stephan | |
| 4,535,148 A * | 8/1985 | Gladfelter et al. | 528/365 |
| 4,841,010 A * | 6/1989 | Dodiuk | 528/99 |
| 5,376,706 A * | 12/1994 | Barsotti et al. | 523/434 |
| 5,789,487 A | 8/1998 | Matyjaszewski et al. | |
| 5,854,364 A | 12/1998 | Senninger et al. | |
| 5,945,491 A | 8/1999 | Matyjaszewski et al. | |
| 6,350,791 B1 * | 2/2002 | Feichtmeier et al. | 522/81 |
| 6,479,585 B2 * | 11/2002 | Hart et al. | 525/119 |
| 6,509,417 B1 * | 1/2003 | Wetzel et al. | 525/208 |
| 6,720,399 B2 | 4/2004 | Husemann et al. | |
| 6,765,078 B2 | 7/2004 | Husemann et al. | |
| 2004/0059085 A1 * | 3/2004 | Shimoda et al. | 528/408 |
| 2004/0106742 A1 * | 6/2004 | Harada et al. | 525/329.7 |
| 2011/0274843 A1 * | 11/2011 | Grittner et al. | 427/374.1 |

FOREIGN PATENT DOCUMENTS

| | | |
|---|---|---|
| DE | 100 08 841 A1 | 9/2001 |
| DE | 10 2004 044 086 A1 | 3/2006 |
| EP | 0 752 435 A1 | 1/1997 |
| EP | 0 824 110 A1 | 2/1998 |
| EP | 0 824 111 A1 | 2/1998 |
| EP | 0 826 698 A1 | 3/1998 |
| EP | 0 841 346 A1 | 5/1998 |
| EP | 0 850 957 A1 | 7/1998 |
| EP | 1 311 555 A1 | 5/2003 |
| EP | 1 317 499 A1 | 6/2003 |
| FR | 1186288 A * | 8/1959 |
| GB | 848350 A * | 9/1960 |
| JP | 63-112676 A * | 5/1988 |
| JP | 4-209624 A * | 7/1992 |
| JP | 2006-152119 A * | 6/2006 |
| WO | WO 00/04106 A1 * | 1/2000 |
| WO | 2006/027387 A1 | 3/2006 |

OTHER PUBLICATIONS

Abstract for Japanese Patent No. 61-296019 A, Urano, Dec. 26, 1986, one page.*

* cited by examiner

*Primary Examiner* — Robert Sellers
(74) *Attorney, Agent, or Firm* — Norris McLaughlin & Marcus PA

(57) ABSTRACT

Crosslinker/accelerator system for thermally crosslinking polyacrylates with functional groups that are adapted to react with epoxy groups in a crosslinking reaction, comprising at least one epoxy group-containing substance and at least one substance that accelerates the crosslinking reaction at a temperature below the melting temperature of the polyacrylate.

13 Claims, 6 Drawing Sheets

THERMALLY CROSSLINKING POLYACRYLATES AND METHOD FOR PRODUCING THE SAME

This is a 371 of PCT/EP2008/053229 filed 18 Mar. 2008 (international filing date).

The invention relates to a process for thermal crosslinking of polyacrylates, to a crosslinker-accelerator system for such crosslinking, and to thermally crosslinking and crosslinked polyacrylates thus prepared.

BACKGROUND OF THE INVENTION

For high-end industrial applications, including more particularly as adhesives, pressure-sensitive adhesives or heat-sealing compositions, the ingredients used include polyacrylates, these polymers having emerged as being highly suitable for the growing requirements in these fields of application.

Thus adhesive compounds are required to have a good tack, but must also meet exacting requirements in the area of shear strength. At the same time, the processing properties must also be good, including in particular a high suitability for the coating of these compositions onto backing materials. This is achieved in particular by polyacrylates with a high molecular weight, high polarity and subsequent efficient crosslinking. Moreover, polyacrylates can be prepared transparently and with weathering stability.

In the coating of polyacrylate compositions from solution or as a dispersion, which can be used, for example, as a pressure-sensitive adhesive, viscoelastic backing or heat-sealing compositions, thermal crosslinking is well-established prior art. In general the thermal crosslinker—for example, a polyfunctional isocyanate, a metal chelate or a polyfunctional epoxide—is added to the solution of a polyacrylate furnished accordingly with functional groups, and this composition is coated in a planar fashion onto a substrate, with the aid of a doctor blade or coating bar, and is subsequently dried. As a result of this process, diluents—that is, organic solvents or water in the case of the dispersions—are evaporated and the polyacrylate, accordingly, is crosslinked. The crosslinking is very important for the coatings, since it gives them sufficient cohesion and thermal shear strength. In the absence of crosslinking, the coatings would be too soft and would flow away under even a low load. Critical to a good coating outcome is the observance of the pot life (processing life, within which the system is in a processable state), which can vary greatly according to crosslinking system. If this life is too short, the crosslinker has already undergone reaction in the polyacrylate solution; the solution is already incipiently crosslinked (partially gelled or completely gelled) and can no longer be coated out uniformly.

For reasons in particular of environmental protection, the technological operation for the preparation of pressure-sensitive adhesives is in a state of continual development. As a result of the environmental strictures, which have become more restrictive, and as a result of the climbing prices for solvents, there is concern as far as possible to eliminate the solvents from the manufacturing operation for polymers. In the industry, therefore, there is growing importance attached to melt processes (also referred to as hotmelt processes) with solvent-free coating technology for the preparation of polymers, particularly of pressure-sensitive adhesives. In such processes, meltable polymer compositions, in other words polymer compositions which at elevated temperatures undergo a transition to the fluid state without decomposing, are processed. Compositions of this kind can be processed outstandingly out of this melt state. In developments of this operation, the preparation as well can be carried out in a low-solvent or solvent-free procedure.

The introduction of the hotmelt technology is imposing increasing requirements on the adhesives. The aforementioned meltable polyacrylate compositions (other names: "polyacrylate hotmelts", "acrylate hotmelts") in particular are being very intensively investigated for improvements. In the coating of polyacrylate compositions from the melt, thermal crosslinking has to date not been very widespread, despite the potential advantages of this process.

To date acrylate hotmelts have primarily been crosslinked by radiation-chemical methods (UV irradiation, EBC irradiation). Yet this is a procedure fraught with disadvantages:

- in the case of crosslinking by means of UV rays, only UV-transparent (UV-pervious) layers can be crosslinked;
- in the case of crosslinking with electron beams (electron beam crosslinking or electron beam curing, also EBC), the electron beams possess only a limited depth of penetration, which is dependent on the density of the irradiated material and on the accelerator voltage;
- in both of the aforementioned processes, the layers after crosslinking have a crosslinking profile, and the pressure-sensitive adhesive layer does not crosslink homogeneously.

The pressure-sensitive adhesive layer must be relatively thin in order for well-crosslinked layers to be obtained. The thickness through which radiation can pass, though indeed varying as a function of density, accelerator voltage (EBC) and active wavelength (UV), is always highly limited; accordingly, it is not possible to effect crosslinking through layers of arbitrary thickness, and certainly not homogeneously.

Also known in the prior art are a number of processes for the thermal crosslinking of acrylate hotmelts. In each of these processes a crosslinker is added to the acrylate melt prior to coating, and then the composition is shaped and wound to form a roll.

Direct thermal crosslinking of acrylate hotmelt compositions containing NCO-reactive groups is described in EP 0 752 435 A1. The isocyanates used, which are free from blocking agents, and are, more particularly, sterically hindered and dimerized isocyanates, require very drastic crosslinking conditions, and so a rational technical reaction presents problems. Under the kind of conditions which prevail on processing from the melt, the procedure described in EP 0 752 435 A1 leads to rapid and relatively extensive crosslinking, and so processing of the composition, particularly with a view to the coating of backing materials, is difficult. In particular it is not possible to obtain any very homogeneous layers of adhesive of the kind that are needed for many technical applications of adhesive tapes.

Also prior art is the use of blocked isocyanates. A disadvantage of this approach is the release of blocking groups or fragments, which have an adverse effect on the adhesive properties. One example is U.S. Pat. No. 4,524,104 A. It describes pressure-sensitive acrylate hotmelt adhesives which can be crosslinked with blocked polyisocyanates together with cycloamidines or salts thereof as catalyst. In this system, the necessary catalyst, but especially the resultant HCN, phenol, caprolactam or the like, may significantly adversely affect the product properties. With this approach, moreover, there is a need for often drastic conditions for the release of the reactive groups. Significant product use is unknown to date and, furthermore, appears unattractive.

DE 10 2004 044 086 A1 describes a process for thermal crosslinking of acrylate hotmelts wherein a solvent-free functionalized acrylate copolymer which, following addition of a thermally reactive crosslinker, has a processing life which is sufficiently long for compounding, conveying and coating, is coated, preferably by means of a roller method, onto a web-like layer of a further material, more particularly a tapelike backing material or a layer of adhesive, and which, after coating, undergoes subsequent crosslinking under mild conditions until the cohesion achieved is sufficient for pressure-sensitive adhesive tapes.

A disadvantage of this process is that the reactivity of the crosslinker (isocyanate) predetermines the free processing life and the degree of crosslinking. Where isocyanates are used, they react in part during actual addition, as a result of which the gel-free time may be very short, depending on the system. A composition with a relatively high fraction of functional groups such as hydroxyl groups or carboxylic acid can in that case no longer be coated sufficiently well in the coatings. A streaky coat interspersed with gel particles, and therefore not homogeneous, would be the consesquence.

A further problem which arises is that the attainable degree of crosslinking is limited. If a higher degree of crosslinking is desired, through addition of a higher quantity of crosslinker, this has drawbacks when polyfunctional isocyanates are used. The composition would react too quickly and would be coatable, if at all, only with a very short processing life and hence at very high coating speeds, which would increase the problems of the non-homogeneous coating appearance.

DE 100 08 841 A1 describes polyacrylates which are obtainable through thermal crosslinking of a polymer mixture which comprises tert-butoxycarbonyl (BOC) protecting groups, a cationic photoinitiator and a difunctional isocyanate and/or difunctional epoxide. Also described is a process for preparing crosslinked polyacrylates, in which the polymers to be crosslinked are first protected by introduction of tert-butoxycarbonyl groups and the crosslinking takes place only after deprotection by thermal treatment of the polyacrylates that have then been deprotected. The introduction of the protecting groups in this case is to prevent the crosslinking reaction, which is only desired subsequently, when the operating temperatures prevailing are already high in the course of earlier stages of processing, as is the case, for example, in the hotmelt process. The protection is valid in particular for the crosslinking reaction at this point in time, but also for all other competing reactions which would attack the unprotected functional groups of the polymer to be processed, more particularly its hydroxide groups.

A disadvantage of the process presented therein is that the reactive groups, after coating, must first be released by UV irradiation. Consequently the disadvantages which apply here for thermal crosslinking are the same as those already recited above for radiation-induced crosslinking (UV irradiation). Moreover, combustible isobutene is released.

EP 1 317 499 A describes a process for crosslinking of polyacrylates via UV-initiated epoxide crosslinking, in which the polyacrylates have been functionalized during the polymerization with corresponding groups. The process offers advantages in relation to the shear strength of the crosslinked polyacrylates as compared with conventional crosslinking mechanisms, particularly as compared with electron beam crosslinking. This specification describes the use of difunctional or polyfunctional, oxygen-containing compounds, more particularly of difunctional or polyfunctional epoxides or alcohols, as crosslinking reagents for functionalized polyacrylates, more particularly functionalized pressure-sensitive acrylate hotmelt adhesives.

Since the crosslinking is initiated by UV rays, the resultant disadvantages are the same as those already mentioned.

Polyacrylate compositions, in particular pressure-sensitive polyacrylate hotmelt adhesives, have thus to date not been readily crosslinkable through crosslinking with polyfunctional epoxides, and this type of crosslinking can therefore not be used industrially for a production process.

It is an object of the invention to enable thermal crosslinking of polyacrylate compositions which can be processed from the melt ("polyacrylate hotmelts"), with a sufficiently long processing life ("pot life") being available for the processing from the melt, especially as compared with the pot life of the known thermal crosslinking systems for polyacrylate hotmelts. At the same time, it ought to be possible not to use protecting groups which would have to be removed again, possibly, by actinic radiation or other methods. Moreover, it ought to be possible to set the degree of crosslinking of the polyacrylate composition to a desired level, without adversely affecting the advantages of the operating regime.

In the text below, the polyacrylate compounds are also referred to, synonymously and in short, as "polyacrylates". For the non-crosslinked polyacrylate compositions, the term "addition polymers" is also used, with the term "polymers" being used for the crosslinked or incipiently crosslinked polyacrylate compositions.

SUMMARY OF THE INVENTION

Surprisingly it has been found that a crosslinker-accelerator system ("crosslinking system") comprising at least one substance containing epoxide groups, as crosslinker, and at least one substance which has an accelerator action for crosslinking reactions by means of compounds containing epoxide groups at a temperature below the melting temperature of a polyacrylate to be crosslinked, as accelerator, led to an outstanding achievement of the stated object.

Substance with an accelerating action means that the substance supports the crosslinking reaction by ensuring an inventively sufficient reaction rate, while the crosslinking reaction in the absence of the accelerator would not take place at all, or would take place with inadequate speed, at selected reaction parameters, here in particular a temperature situated below the melting temperature of the polyacrylates. The accelerator thus ensures a substantial improvement in the reaction kinetics of the crosslinking reaction. In accordance with the invention this may take place catalytically, or alternatively by incorporation into the reaction events.

DETAILED DESCRIPTION

The polyacrylates for crosslinking contain functional groups suitable for entering into linking reactions—particularly in the sense of addition reactions or substitution reactions—with epoxide groups.

Epoxides without such accelerators react only under influence of heat, and in particular only after prolonged supply of thermal energy. The known accelerator substances such as $ZnCl_2$, for example, do lead to an improvement in the reactivity in the temperature range of the melt, and yet, in the absence of thermal energy supplied from externally (i.e., for example, at room temperature), the reactivity of the epoxides is lost, even in the presence of the accelerators, and so the crosslinking reaction terminates (at the given temperature, therefore, they no longer have an accelerating action in the sense set out above). This is a problem in particular when the polyacrylates processed in hotmelt form are coated within relatively short time periods (a few minutes) and then, in the absence of further supply of heat, cool rapidly down to room temperature or storage temperature. Without the initiation of a further crosslinking reaction it would not be possible to achieve high degrees of crosslinking, and this, especially for many areas of application of polyacrylates, such as their use as pressure-sensitive adhesives in particular, would result in inadequate cohesion of the composition.

If the crosslinker system were to be added too early to the polyacrylate system, with accelerators that function only under hot conditions, such as epoxide crosslinkers in the presence of $ZnCl_2$, for example (in order to obtain a sufficient degree of crosslinking), then it would no longer be possible to process the compositions homogeneously, and particularly not to compound them and use them for coating, since the compositions would undergo excessive and excessively rapid crosslinking or even gelling (uncontrolled crosslinking).

A transfer to hotmelt systems was therefore not very obvious to the person skilled in the art.

Only through the inventive combination of the stated components has it been possible to offer a thermal crosslinking process which, in the processing of the polyacrylate hotmelt compositions, in other words in the melt, does not lead to uncontrolled reactions (gelling of the composition) and allows a sufficiently long time (pot life) for processing, so that, particularly in the case of coating out as a layer or application to a backing, it is possible to create a uniform and bubble-free coat. The crosslinker-accelerator system is able, moreover, to carry out further crosslinking of the polyacrylate after processing, particularly after coating out as a layer or after application to a backing, with a significantly reduced supply of thermal energy than that required to obtain the melt, in other words after cooling, without the need for actinic irradiation.

In particular, by virtue of the crosslinker-accelerator system, the polyacrylates are able to undergo further crosslinking without additional thermal energy supplied actively, in other words by process engineering means (heating), in particular after cooling to room temperature (RT, 20° C.) or to a temperature close to room temperature. In this phase of crosslinking in particular it is possible to do without heating, without this leading to a termination of the crosslinking reaction.

The main claim therefore relates to a crosslinker-accelerator system for the thermal crosslinking of polyacrylates, comprising at least one substance containing epoxide groups—as crosslinker—and at least one substance which has an accelerating effect for the linking reaction at a temperature below the melting temperature of the polyacrylate, more particularly at room temperature (accelerator); in particular polyfunctional amines. In this case, the crosslinker-accelerator system is used more particularly in the presence of functional groups which are able to enter into a linking reaction, especially in the form of an addition or substitution, with epoxide groups. Preferably, then, there is a linking of the units bearing the functional groups to the units bearing the epoxide groups (particularly in the sense of crosslinking of the corresponding polymer units carrying the functional groups, via the substances carrying the epoxide groups, as linking bridges).

A further aspect of the invention relates to a crosslinking process for polyacrylates that can be carried out by means of the crosslinker-accelerator system of the invention; in particular a process for the thermal crosslinking of pressure-sensitive polyacrylate adhesives which can be processed from the melt, which uses the crosslinker-accelerator system described above.

Where details are given below, in connection with the process of the invention, of advantageous embodiments of the crosslinker-accelerator system employed, i.e., for example, advantageous compositions and the like, these details are also to be considered to apply to the crosslinker-accelerator system of the invention per se—even without direct reference to the process descriptions and process claims.

The substances containing epoxide groups are more particularly polyfunctional epoxides, in other words those having at least two epoxide groups; accordingly, overall, there is an indirect linking of the units which carry the functional groups.

In an outstanding and unexpected way, the process of the invention offers the advantage that it is possible to offer a stable crosslinking process for polyacrylates, with outstanding control possibility in relation to the crosslinking pattern, as a result of substantial decoupling of degree of crosslinking and reactivity (reaction kinetics).

The process of the invention serves outstandingly for the thermal crosslinking of polyacrylates. The starting point is a polyacrylate composition (referred to below simply as "polyacrylate"), more particularly a polyacrylate copolymer, based on acrylic esters and/or methacrylic esters, with at least some of the acrylic esters and/or methacrylic esters containing functional groups which are able to react in the manner outlined above, more particularly with formation of a covalent bond, with epoxide groups.

The crosslinked polyacrylates can be employed for all possible fields of application in which a certain cohesion in the composition is desired. The process is especially advantageous for viscoelastic materials on a polyacrylate basis. One specific area of application of the process of the invention is in the thermal crosslinking of pressure-sensitive adhesives (PSAs), including, in particular, hotmelt PSAs.

With particular advantage the procedure adopted in respect of the process of the invention is one in which the crosslinking is initiated in the melt of the polyacrylate, which is subsequently cooled at a point in time at which the polyacrylate retains outstanding processing properties—that is, for example, can be coated homogeneously and/or can be shaped outstandingly. For adhesive tapes in particular a homogeneous, uniform coat pattern is needed, with no lumps, specks or the like to be found in the layer of adhesive. Correspondingly homogeneous polyacrylates are also required for the other forms of application.

Shapability or coatability exists when the polyacrylate has not yet undergone crosslinking or has undergone crosslinking only to a slight degree; advantageously the degree of crosslinking at the start of cooling is not more than 10%, preferably not more than 3%, more preferably not more than 1%. The crosslinking reaction continues to progress after cooling as well, until the ultimate degree of crosslinking is attained. The term "cooling" here and below also encompasses the passive cooling as a result of removing heating.

The process of the invention can be carried out in particular by initiating the crosslinking in the melt of the polyacrylate in the presence of the crosslinker, more particularly of the crosslinker-accelerator system (i.e., thermally), preferably at a point in time shortly before further processing, more particularly before shaping or coating. This takes place commonly in a processing reactor (compounder, an extruder for example). The composition is then removed from the compounder and subjected to further processing and/or shaping as desired. In the course of processing or shaping, or afterwards, the polyacrylate is cooled, by deploying active cooling and/or by adjusting the heating, or by heating the polyacrylate to a temperature below the processing temperature (here as well, where appropriate, after active cooling beforehand), if the temperature is not to drop to room temperature.

The further processing or shaping may with particular advantage be the process of coating onto a permanent or temporary backing.

In one very advantageous variant of the invention, the polyacrylate, at or after removal from the processing reactor, is coated onto a permanent or temporary backing and, in the course of coating or after coating, the polyacrylate composition is cooled to room temperature (or a temperature in the vicinity of room temperature), more particularly immediately after coating.

Initiation "shortly before" further processing means in particular that at least one of the components necessary for crosslinking (more particularly the substances containing epoxide groups and/or the accelerator) is added as late as possible to the hotmelt (i.e. to the melt) (homogeneous processibility on account of degree of crosslinking which is still slight here; see above) but as early as necessary for effective homogenization with the polymer composition.

The crosslinker-accelerator system is selected such that the crosslinking reaction proceeds at a temperature below the melting temperature of the polyacrylate composition, more particularly at room temperature. The possibility of crosslinking at room temperature offers the advantage that there is no need for additional energy to be supplied and therefore that a cost saving can be recorded.

The term "crosslinking at room temperature" in this case refers in particular to the crosslinking at typical storage temperatures of adhesive tapes, viscoelastic non-adhesive materials or the like, and should therefore not be limited to 20° C. In accordance with the invention it is of course also advantageous if the storage temperature differs from 20° C. on account of climatic or other temperature fluctuations—or the room temperature differs from 20° C. on account of local circumstances—and the crosslinking—in particular without further supply of energy—continues.

Substances used that contain epoxide groups are, in particular, polyfunctional epoxides, in other words those which contain at least two epoxide units per molecule (i.e. are at least difunctional). They may be both aromatic and aliphatic compounds.

Outstandingly suitable polyfunctional epoxides are oligomers of epichlorohydrin, epoxy ethers of polyhydric alcohols [especially ethylene, propylene and butylene glycols, polyglycols, thiodiglycols, glycerol, pentaerythritol, sorbitol, polyvinyl alcohol, polyallyl alcohol and the like], epoxy ethers of polyhydric phenols [in particular resorcinol, hydroquinone, bis(4-hydroxyphenyl)methane, bis(4-hydroxy-3-methylphenyl)methane, bis(4-hydroxy-3,5-dibromophenyl)methane, bis(4-hydroxy-3,5-difluorophenyl)methane, 1,1-bis(4-hydroxyphenyl)ethane, 2,2-bis(4-hydroxyphenyl)propane, 2,2-bis(4-hydroxy-3-methylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dichlorophenyl)propane, bis(4-hydroxyphenyl)phenylmethane, bis(4-hydroxyphenyl)phenylmethane, bis(4-hydroxyphenyl)diphenylmethane, bis(4-hydroxyphenyl)-4'-methylphenylmethane, 1,1-bis(4-hydroxyphenyl)-2,2,2-trichlorothane, bis(4-hydroxyphenyl)-(4-chlorophenyl)methane, 1,1-bis(4-hydroxyphenyl)cyclohexane, bis(4-hydroxyphenyl)cyclohexylmethane, 4,4'-dihydroxybiphenyl, 2,2'-dihydroxybiphenyl, 4,4'-dihydroxydiphenyl sulphone] and also their hydroxyethyl ethers, phenol-formaldehyde condensation products, such as phenol alcohols, phenol-aldehyde resins and the like, S- and N-containing epoxides (for example N,N-diglycidylaniline, N,N'-dimethyldiglycidyl-4,4-diaminodiphenylmethane) and also epoxides which have been prepared by standard methods from polyunsaturated carboxylic acids or monounsaturated carboxylic acid residues of unsaturated alcohols, glycidyl esters, polyglycidyl esters which can be obtained by polymerizing or copolymerizing glycidyl esters of unsaturated acids or are obtainable from other acidic compounds (cyanuric acid, diglycidyl sulphide, cyclic trimethylene trisulphone and/or their derivatives and others).

Examples of very suitable ethers are 1,4-butanediol diglycidyl ether, polyglycerol-3 glycidyl ether, cyclohexanedimethanol diglycidyl ether, glycerol triglycidyl ether, neopentylglycol diglycidyl ether, pentaerythritol tetraglycidyl ether, 1,6-hexanediol diglycidyl ether, polypropylene glycol diglycidyl ethers, trimethylolpropane triglycidyl ether, bisphenol A diglycidyl ether and bisphenol-F diglycidyl ether.

Accelerators used are with particular preference amines (to be interpreted formally as substitution products of ammonia; in the formulae which follow, these substituents are represented by "R" and encompass, in particular, alkyl radicals and/or aryl radicals and/or other organic radicals), with particular preference those amines which enter into only slight reactions, or none, with the building blocks of the polyacrylates.

As accelerators it is possible in principle to select primary amines ($NRH_2$), secondary amines ($NR_2H$) and tertiary amines ($NR_3$), naturally including those which have two or more primary and/or secondary and/or tertiary amine groups. Particularly preferred accelerators, however—especially in connection with the reasons given above—are tertiary amines, such as, for example, triethylamine, triethylenediamine, benzyldimethylamine, dimethylaminomethylphenol, 2,4,6-tris(N,N-dimethylaminomethyl)phenol, and N,N'bis(3-dimethylamino)propyl)urea.

As accelerators it is also possible with advantage to use polyfunctional amines such as diamines, triamines and/or tetramines.

Outstandingly suitable are, for example, diethylenetriamine, triethylenetetramine, trimethylhexamethylenediamine.

Accelerators that are also outstandingly suitable are pyridine, imidazoles (such as 2-methylimidazole, for example), 1,8-diazabicyclo[5.4.0]undec-7-ene. Cycloaliphatic polyamines as well can be used outstandingly as accelerators.

Also suitable are phosphate-based accelerators such as phosphines and/or phosphonium compounds, such as triphenylphosphine or tetraphenylphosphonium tetraphenylborate, for example.

The composition to be crosslinked in accordance with the invention comprises at least one polyacrylate. This is an addition polymer which is obtainable by free-radical addition polymerization of acrylic monomers, a term which includes methylacrylic monomers, and of further, copolymerizable monomers if desired.

The polyacrylate is preferably a polyacrylate crosslinkable with epoxide groups. Correspondingly, monomers or comonomers used are preferably functional monomers crosslinkable with epoxide groups; employed in particular here are monomers with acid groups (especially carboxylic, sulphonic or phosphonic acid groups) and/or hydroxyl groups and/or acid anhydride groups and/or epoxide groups and/or amine groups; monomers containing carboxylic acid groups are preferred. It is especially advantageous if the polyacrylate contains copolymerized acrylic acid and/or methacrylic acid.

Further monomers which can be used as comonomers for the polyacrylate are, for example, acrylic and/or methacrylic esters having up to 30 C atoms, vinyl esters of carboxylic acids containing up to 20 C atoms, vinylaromatics having up to 20 C atoms, ethylenically unsaturated nitriles, vinyl halides, vinyl ethers of alcohols containing 1 to 10 C atoms, aliphatic hydrocarbons having 2 to 8 C atoms and 1 or 2 double bonds, or mixtures of these monomers.

For the process of the invention it is preferred to use a polyacrylate which on the following reactant mixture, comprising in particular softening monomers, and also monomers with functional groups which are capable of entering into reactions with the epoxy groups, more particularly addition reactions and/or substitution reactions, and also, optionally, further copolymerizable comonomers, especially hardening monomers. The nature of the polyacrylate to be prepared (pressure-sensitive adhesive; heat-sealing compound, viscoelastic non-adhesive material and the like) can be influenced in particular through variation of the glass transition temperature of the polymer by means of different weight fractions of the individual monomers.

For purely crystalline systems at the melting point T, there is a thermal equilibrium between crystal and liquid. Amorphous or partially crystalline systems, in contrast, are characterized by the transformation of the more or less hard amorphous or partially crystalline phase into a softer (rubber-like to viscous) phase. At the glass transition point, particularly in the case of polymeric systems, there is a "thawing" (or "freezing" in the case of cooling) of the Brownian molecular motion of relatively long chain segments.

The transition from melting point T, (also "melting temperature"; actually defined only for purely crystalline systems; "polymer crystals") to the glass transition point $T_g$ (also "glass transition temperature", "glass temperature") can therefore be regarded as a fluid one, depending on the proportion of partial crystallinity in the sample under analysis.

In the context of this specification, in the sense of the remarks above, a statement of the glass transition point encompasses the melting point as well: that is, the glass transition point (or else, synonymously, the glass transition temperature) is also understood as the melting point for the corresponding "melting" systems. The statements of the glass transition temperatures are based on the determination by means of dynamic mechanical analysis (DMA) at low frequencies.

In order to obtain polymers, PSAs or heat-sealing compounds for example, having desired glass transition temperatures, the quantitative composition of the monomer mixture is advantageously selected such that the desired $T_g$ value for the polymer is produced in accordance with an equation (E1) in analogy to the Fox equation (cf. T. G. Fox, Bull. Am. Phys. Soc. 1 (1956) 123).

$$\frac{1}{T_g} = \sum_n \frac{w_n}{T_{g,n}} \quad (E1)$$

In this equation, n represents the serial number of the monomers used, $w_n$, the mass fraction of the respective monomer n (% by weight) and $T_{g,n}$ the respective glass transition temperature of the homopolymer of the respective monomers n in K.

Preference is given to using a polyacrylate which can be traced back to the following monomer composition:
a) acrylic esters and/or methacrylic esters of the following formula $CH_2=C(R')(COOR'')$ where $R'=H$ or $CH_3$ and r' is an alkyl radical having 4 to 14 C atoms,
b) olefinically unsaturated monomers with functional groups of the kind already defined for reactivity with epoxide groups,
c) optionally further acrylates and/or methacrylates and/or olefinically unsaturated monomers which are copolymerizable with component (a).

For the use of the polyacrylate as a PSA, the fractions of the corresponding components (a), (b) and (c) are selected such that the polymerization product has more particularly a glass transition temperature 15° C. (DMA at low frequencies).

For the preparation of PSAs it is very advantageous to select the monomers of component (a) with a fraction of 45% to 99% by weight, the monomers of component (b) with a fraction of 1% to 15% by weight and the monomers of component (c) with a fraction of 0% to 40% by weight (the figures are based on the monomer mixture for the "base polymer", i.e. without additions of any additives to the completed polymer, such as resins etc).

For the use of a hotmelt adhesive, in other words a material which becomes tacky only as a result of heating, the fractions of the corresponding components (a), (b) and (c) are selected in particular such that the copolymer has a glass transition temperature ($T_g$) between 15° C. and 100° C., preferably between 30° C. and 80° C., more preferably between 40° C. and 60° C. The fractions of components (a), (b) and (c) are to be selected accordingly.

A viscoelastic material, which, for example, can typically be laminated on both sides with adhesive layers, has in particular a glass transition temperature ($T_g$) between −50° C. to +100° C., preferably between −20° C. to −60° C., more preferably 0° C. to 40° C. Here again, the fractions of components (a), (b) and (c) are to be selected accordingly.

The monomers of component (a) are more particularly softening and/or apolar monomers.

For the monomers (a) it is preferred to use acrylic monomers which comprise acrylic and methacrylic esters with alkyl groups composed of 4 to 14 C atoms, preferably 4 to 9 C atoms. Examples of monomers of this kind are n-butyl acrylate, n-butyl methacrylate, n-pentyl acrylate, n-pentyl methacrylate, n-amyl acrylate, n-hexyl acrylate, hexyl methacrylate, n-heptyl acrylate, n-octyl acrylate, n-octyl methacrylate, n-nonyl acrylate, isobutyl acrylate, isooctyl acrylate, isooctyl methacrylate, and their branched isomers, such as, for example, 2-ethylhexyl acrylate, 2-ethylhexyl methacrylate.

The monomers of component (b) are, in particular, olefinically unsaturated monomers (b) with functional groups, in particular with functional groups which are able to enter into a reaction with the epoxide groups.

For component (b) it is preferred to use monomers with functional groups selected from the following recitation: hydroxyl, carboxyl, sulphonic acid or phosphonic acid groups, acid anhydrides, epoxides, amines.

Particularly preferred examples of monomers of component (b) are acrylic acid, methacrylic acid, itaconic acid, maleic acid, fumaric acid, crotonic acid, aconitic acid, dimethylacrylic acid, β-acryloyloxypropionic acid, trichloracrylic acid, vinylacetic acid, vinylphosphonic acid, itaconic acid, maleic anhydride, hydroxyethyl acrylate, hydroxypropyl acrylate, hydroxyethyl methacrylate, hydroxypropyl methacrylate, 6-hydroxyhexyl methacrylate, allyl alcohol, glycidyl acrylate, glycidyl methacrylate.

For component (c) it is possible in principle to use all vinylically functionalized compounds which are copolymerizable with component (a) and/or with component (b) and are also able to serve for setting the properties of the resultant PSA.

Exemplified monomers for component (c) are as follows: methyl acrylate, ethyl acrylate, propyl acrylate, methyl methacrylate, ethyl methacrylate, benzyl acrylate, benzyl methacrylate, sec-butyl acrylate, tert-butyl acrylate, phenyl acrylate, phenyl methacrylate, isobornyl acrylate, isobornyl methacrylate, tert-butylphenyl acrylate, tert-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-trimethylcyclohexyl acrylate, 3,5-dimethyladamantyl acrylate, 4-cumylphenyl methacrylate, cyanoethyl acrylate, cyanoethyl methacrylate, 4-biphenyl acrylate, 4-biphenyl methacrylate, 2-naphthyl acrylate, 2-naphthyl methacrylate, tetrahydrofurfuryl acrylate, diethylaminoethyl acrylate, diethylaminoethyl methacrylate, dimethylaminoethyl acrylate, dimethylaminoethyl methacrylate, 2-butoxyethyl acrylate, 2-butoxyethyl methacrylate, methyl 3-methoxyacrylate, 3-methoxybutyl acrylate, phenoxyethyl acrylate, phenoxyethyl methacrylate, 2-phenoxyethyl methacrylate, butyldiglycol methacrylate, ethylene glycol acrylate, ethylene glycol monomethylacrylate, methoxy-polyethylene glycol methacrylate 350, methoxy-polyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate, dimethylaminopropylacrylamide, dimethylaminopropylmethacrylamide, N-(1-methylundecyl)acrylamide, N-(n-butoxymethyl)acrylamide, N-(butoxymethyl)methacrylamide, N-(ethoxymethyl)acrylamide, N-(n-octadecyl)acrylamide, and also N,N-dialkyl-substituted amides, such as, for example, N,N-dimethylacrylamide, N,N-dimethylmethacrylamide, N-benzylacrylamides, N-isopropylacrylamide, N-tert-butylacrylamide, N-tert-octylacrylamide, N-methylolacrylamide, N-methylolmethacrylamide, acrylonitrile, methacrylonitrile, vinyl ethers, such as vinyl methyl ether, ethyl vinyl ether, vinyl isobutyl ether, vinyl esters, such as vinyl acetate, vinyl chloride, vinyl halides, vinylidene chloride, vinylidene halide, vinylpyridine, 4-vinylpyridine, N-vinylphthalimide, N-vinyllactam, N-vinylpyrrolidone, styrene, a- and p-methylstyrene, a-butylstyrene, 4-n-butylstyrene, 4-n-decylstyrene, 3,4-dimethoxystyrene, macromonomers such as 2-polystyrene-ethyl methacrylate (molecular weight $M_w$ of 4000 to 13 000 g/mol), poly(methyl methacrylate)ethyl methacrylate ($M_w$ of 2000 to 8000 g/mol).

Monomers of component (c) can advantageously also be selected such that they contain functional groups which assist subsequent radiation-chemical crosslinking (by means of electron beams, UV, for example). Examples of suitable copolymerizable photoinitiators include benzoin acrylate and acrylate-functionalized benzophenone derivatives. Monomers which assist crosslinking by electron beams are, for example, tetrahydrofurfuryl acrylate, N-tert-butylacrylamide, and allyl acrylate, this recitation not being conclusive.

Preparation of the Addition Polymers

The polyacrylates can be prepared by the methods familiar to a person skilled in the art, with particular advantage by conventional free-radical polymerizations or controlled free-radical addition polymerizations. The polyacrylates can be prepared by copolymerizing the monomeric components using the typical addition-polymerization initiators and also, where appropriate, regulators, with polymerization taking place at the usual temperatures in bulk, in emulsion, for example in water or liquid hydrocarbons, or in solution.

The polyacrylates are preferably prepared by addition polymerization of the monomers in solvents, more particularly in solvents with a boiling range from 50 to 150° C., preferably from 60 to 120° C., using the customary amounts of addition-polymerization initiators, generally 0.01% to 5%, more particularly 0.1% to 2% by weight (based on the total weight of the monomers).

Suitable in principle are all of the customary initiators for acrylates that are familiar to a person skilled in the art. Examples of free-radical sources are peroxides, hydroperoxides and azo compounds, examples being dibenzoyl peroxide, cumene hydroperoxide, cyclohexanone peroxide, di-tert-butyl peroxide, cyclohexylsulphonyl acetyl peroxide, diisopropyl percarbonate, t-butyl peroctoate, benzpinacol. In one very preferred procedure the free-radical initiator used is 2,2'-azobis(2-methylbutyronitrile) (Vazo® 67™ from DuPont) or 2,2'-azobis(2-methylpropionitrile) (2,2'-azobisisobutyronitrile; AIBN; Vazo® 64™ from DuPont).

Suitable solvents include alcohols, such as methanol, ethanol, n- and iso-propanol, n- and iso-butanol, preferably isopropanol and/or isobutanol; and also hydrocarbons such as toluene and, in particular benzines with a boiling range from 60 to 120° C. In particular it is possible to use ketones, such as acetone, methyl ethyl ketone, methyl isobutyl ketone, and esters, such as ethyl acetate, and also mixtures of solvents of the stated kind, preference being given to mixtures comprising isopropanol, more particularly in amounts from 2% to 15% by weight, preferably 3% to 10% by weight, based on the solvent mixture employed.

The weight-average molecular weights $M_w$ of the polyacrylates are situated preferably in a range from 20 000 to 2 000 000 g/mol; very preferably in a range from 100 000 to 1 000 000 g/mol, most preferably in a range from 150 000 to 500 000 g/mol [the figures for average molecular weight $M_w$ and the polydispersity PD in this specification relate to the determination by gel permeation chromatography (see measurement method A3; experimental section)]. For this purpose it may be advantageous to carry out the addition polymerization in the presence of suitable addition-polymerization regulators such as thiols, halogen compounds and/or alcohols, in order to set the desired average molecular weight.

The polyacrylate preferably has a K value of 30 to 90, more preferably of 40 to 70, as measured in toluene (1% strength solution, 21° C.). The K value of Fikentscher is a measure of the molecular weight and viscosity of the addition polymer.

Particularly suitable for the process of the invention are polyacrylates which have a narrow molecular weight distribution (polydispersity PD<4). In spite of a relatively low molecular weight, these compositions after crosslinking have a particularly good shear strength. Moreover, the lower molecular weight allows easier processing from the melt, since the flow viscosity is lower than that of a polyacrylate with a broader distribution, with substantially identical service properties. Polyacrylates with a narrow distribution can be prepared advantageously by anionic addition polymerization or by controlled free-radical addition polymerization methods, the latter being particularly suitable. Examples of polyacrylates of this kind which are prepared by the RAFT process are described in U.S. Pat. Nos. 6,765,078 B2 and 6,720,399 B2. Via N-oxyls as well it is possible to prepare such polyacrylates, as described for example in EP 1 311 555 B1. Atom transfer radical polymerization (ATRP) as well can be used advantageously for the synthesis of polyacrylates with a narrow distribution, the initiator used being preferably monofunctional or difunctional secondary or tertiary halides and, to abstract the halide(s), complexes of Cu, Ni, Fe, Pd, Pt, Ru, Os, Rh, Co, Ir, Ag or Au (cf., for example, EP 0 824 111 A1; EP 826 698 A1; EP 824 110 A1; EP 841 346 A1; EP 850 957 A1). The various possibilities of ATRP are further described in specifications U.S. Pat. Nos. 5,945,491 A, 5,854, 364 A and 5,789,487 A.

The polyacrylates obtainable by the process of the invention can be admixed, prior to thermal crosslinking, with at least one tackifying resin. Tackifying resins for addition are the tackifier resins that are already known and are described in the literature. Reference may be made in particular to all aliphatic, aromatic, alkylaromatic hydrocarbon resins, hydrocarbon resins based on pure monomers, hydrogenated hydrocarbon resins, functional hydrocarbon resins and natural resins. With preference it is possible to use pinene resins, indene resins and rosins, their disproportionated, hydrogated, polymerized and esterified derivatives and salts, terpene resins and terpene-phenolic resins, and also C5, C9 and other hydrocarbon resins. Combinations of these and further resins may also be used with advantage in order to set the properties of the resultant adhesive in accordance with what is desired. With particular preference it is possible to employ all resins that are compatible (soluble) with the polyacrylate in question. One particularly preferred procedure adds terpene-phenolic resins and/or rosin esters.

Optionally it is also possible for powderous and granular fillers, dyes and pigments, including in particular those which are abrasive and reinforcing, such as, for example, chalks ($CaCO_3$), titanium dioxides, zinc oxides and carbon blacks, even in high fractions, in other words from 1% to 50% by weight, based on the overall formula, to be metered outstandingly into the polyacrylate melt, incorporated homogeneously and coated on a 2-roll applicator. The conventional methods often fail here, owing to the then very high viscosity of the compounded formulation as a whole.

With great preference it is possible to use different forms of chalk as filler, particular preference being given to the use of Mikrosöhl chalk. With preferred fractions of up to 30% by weight, there is virtually no change in the adhesive properties (shear strength at RT, instantaneous bond strength to steel and PE) as the result of the addition of filler.

It is possible, furthermore, for low-flammability fillers, such as ammonium polyphosphate, for example, and also electrically conductive fillers (such as, for example, conductive carbon black, carbon fibres and/or silver-coated beads), and also thermally conductive materials (such as, for example, boron nitride, aluminium oxide, sodium carbide), and also ferromagnetic additives (such as, for example, iron (III) oxides), and also additives for increasing volume, especially for producing foamed layers (such as, for example, expandants, solid glass beads, hollow glass beads, microbeads of other materials, expandable microballoons, silica, silicates, organic renewable raw materials, examples being wood flour, organic and/or inorganic nanoparticles, fibres), and also ageing inhibitors, light stabilizers, ozone protectants, compounding agents and/or expandants, to be added or compounded in before or after the concentration of the polyacrylate. Ageing inhibitors which can be used are preferably not only primary inhibitors, such as 4-methoxyphenol, but also secondary ageing inhibitors, such as Irgafos® TNPP from Ciba Geigy, both alone and in combination with one another. At this point only the intention here is to refer to further corresponding Irganox® products from Ciba Geigy and Hostano® from Clariant. Further outstanding agents against ageing that can be used include phenothiazine (C-radical scavenger) and also hydroquinone methyl ether in the presence of oxygen, and also oxygen itself.

Optionally the customary plasticizers (plasticizing agents) can be added, more particularly at concentrations of up to 5% by weight. Plasticizers which can be metered in include, for example, low molecular mass polyacrylates, phthalates, water-soluble plasticizers, plasticizer resins, phosphates, polyphosphates and/or citrates.

In addition, optionally, it is possible for the thermally crosslinkable acrylate hotmelt to be mixed or blended with other polymers. Suitable for this purpose are polymers based on natural rubber, synthetic rubber, EVA, silicone rubber, acrylic rubber, polyvinyl ether. In this context it proves to be advantageous to add these polymers in granulated or otherwise-comminuted form to the acrylate hotmelt prior to the addition of the thermal crosslinker. The polymer blend is produced in an extruder, preferably in a multi-screw extruder or in a planetary roller mixer. To stabilize the thermally crosslinked acrylate hotmelt, and also, in particular, polymer blends of thermally crosslinked acrylate hotmelts and other polymers, it may be useful to irradiate the shaped material with low doses of electron beams. Optionally for this purpose it is possible to admix the polyacrylate with crosslinking promoters such as di-, tri- or polyfunctional acrylate, polyester and/or urethane acrylate.

Further Procedure

The addition polymer can be concentrated in the absence of the crosslinker and accelerator substances. Alternatively it is possible to add one of these classes of compound to the addition polymer even before concentration, so that the concentration then takes place in the presence of this or these substances.

The addition polymers are then transferred to a compounder. In particular embodiments of the process of the invention, concentration and compounding may take place in the same reactor.

As a compounder it is possible more particularly to use an extruder. Within the compounder the addition polymers are present in the melt: either by having been introduced already in the melt state, or by being heated in the compounder until the melt is obtained. In the compounder the addition polymers are maintained in the melt by heating. Where neither crosslinkers (epoxides) nor accelerators are present in the addition polymer, the possible temperature in the melt is limited by the decomposition temperature of the addition polymer. The operating temperature in the compounder is typically between 80 to 150° C., more particularly between 100 and 120° C.

The substances containing epoxide groups are added to the addition polymer before or with the addition of accelerator.

The substances containing epoxide groups can be added to the monomers even before the polymerization phase or during that phase, provided they are sufficiently stable for it. Advantageously, however, the substances containing epoxide groups are added to the addition polymer either prior to addition to the compounder or in the course of addition to the compounder, in other words are introduced into the compounder together with the addition polymers.

In very advantageous procedure the accelerator substances are added to the addition polymers shortly before the further processing of the polymers, more particularly before coating or other shaping. The time window of the addition prior to coating is guided in particular by the available pot life, in other words the processing life in the melt, without disadvantageous alteration to the properties of the resultant product. With the process of the invention it has been possible to obtain pot lives of several minutes up to several tens of minutes (depending on the choice of experimental parameters), and so the accelerator ought to be added within this timespan prior to coating. Advantageously the accelerator is added to the hotmelt as late as possible but as early as necessary for there to be effective homogenization with the polymer composition.

Timespans which have emerged as being very advantageous here are those from 2 to 10 minutes, more particularly those of more than 5 minutes, at an operating temperature of 110 to 120° C.

The crosslinkers (epoxides) and the accelerators can also both be added shortly before the further processing of the polymer, in other words advantageously in the phase as set out above for the accelerators. For this purpose it is advantageous to introduce the crosslinker-accelerator system into the operation at one and the same point, including in the form of an epoxide-accelerator mixture.

In principle it is also possible to switch the times and locations of addition of crosslinker and accelerator in the embodiments set out above, and so the accelerator can be added before the substances containing epoxide groups.

In the compounding operation the temperature of the addition polymer on addition of the crosslinkers and/or of the accelerators is between 50 and 150° C., preferably between 70 and 130° C., more preferably between 80 and 120° C.

It has in principle emerged as being very advantageous if the crosslinker, in other words the substance containing epoxide groups, is added at 0.1-5% by weight, based on the polymer without additives.

It is advantageous to add the accelerator at 0.05-5% by weight, based on the additive-free polymer.

It is particularly advantageous if the crosslinker fraction is selected such as to result in an elastic fraction of at least 20% in the crosslinked polyacrylates. Preferably the elastic fraction is at least 40%, more preferably at least 60% (measured in each case according to measurement method H3; cf. Experimental Section).

In principle the number of functional groups, in other words in particular of the carboxylic acid groups, can be selected such that they are in excess in relation to the epoxide groups, and such, therefore, that in the polymer there are only a sufficient number of functional groups—that is, potential crosslinking sites or linking sites in the polymer—in order to obtain the desired crosslinking.

For the action of the crosslinker-accelerator system of the invention, particularly in the context of the process of the invention, including its variant embodiments, it is particularly advantageous to harmonize the amounts of accelerator and crosslinker (substances containing epoxide groups) with one another and also, where appropriate, with the amount of functional groups in the polyacrylate that are reactive for the crosslinking reaction, and to optimize these amounts for the desired crosslinking outcome (on this point see also the remarks concerning the corresponding relationships and concerning the control facility of the process).

To specify the ratios of the constituents of the crosslinker-accelerator system to one another it is possible more particularly to employ the ratio of the number of epoxide groups in the crosslinker to the number of reactive functional groups in the polymer. In principle this ratio is freely selectable, and so there is alternatively an excess of functional groups, numerical equivalence of the groups, or an excess of epoxide groups.

Advantageously this ratio is selected such that the epoxide groups are in deficit (up to a maximum of numerical equivalence); with very particular preference, the ratio of the total number of epoxide groups in the crosslinker to the number of functional groups in the polymer is in the range from 0.1:1 to 1:1.

A further parameter is the ratio of the number of acceleration-active groups in the accelerator to the number of epoxide groups in the crosslinker. Acceleration-active groups are reckoned in particular to be secondary amine groups and tertiary amine groups. This ratio as well is freely selectable, and so there is alternatively an excess of acceleration-active groups, numerical equivalence of the groups, or an excess of epoxide groups.

It is particularly advantageous if the number of acceleration-active groups in the accelerator to the number of epoxide groups in the crosslinker is from 0.2:1 to 4:1.

After the composition has been compounded, the polymer is subjected to further processing, more particularly to coating onto a permanent or temporary backing (the permanent backing remains joined to the layer of adhesive in application, whereas the temporary backing is removed again in the further processing operation, for example in the converting of the adhesive tape, or is removed again from the layer of adhesive at application).

The self-adhesive compositions can be coated using hotmelt coating nozzles that are known to the person skilled in the art, or, preferably, using roll applicators, including coating calenders. The coating calenders may be composed advantageously of two, three, four or more rolls.

Preferably at least one of the rolls is provided with an anti-adhesive roll surface, this applying preferably to all of the rolls that come into contact with the polyacrylate. In an advantageous procedure it is possible for all of the rolls of the calender to have an anti-adhesive finish.

An anti-adhesive roll surface used is with particular preference a steel-ceramic-silicone composite. Roll surfaces of this kind are resistant to thermal and mechanical loads. Surprisingly for the person skilled in the art it has been found particularly advantageous to use roll surfaces which have a surface structure, more particularly of a kind such that the surface does not produce full contact with the polymer layer to be processed, but instead that the area of contact is lower as compared with a smooth roll. Particularly advantageous are structured rolls such as engraved metal rolls (engraved steel rolls, for example).

Coating may take place with particular advantage in accordance with the coating techniques as set out in WO 2006/027387 A1 from page 12 line 5 to page 20 line 13, and more particularly as in the sections "Variant A" (page 12), "Variant B" (page 13), "Variant C" (page 15), "Method D" (page 17), "Variant E" (page 19), and also Figures FIGS. 1 to 6. The stated disclosure passages from WO 2006/027387 A1 are therefore explicitly included in the disclosure content of the present specification.

Particularly good results are achieved with the two- and three-roll calender stacks (cf. in particular variants B—FIG. 3, variant C—FIG. 4 and variant D—FIG. 4 of WO 2006/027387 A1) through the use of calender rolls which are equipped with anti-adhesive surfaces, or with surface-modified rolls—particularly noteworthy here are engraved metal rolls. These engraved metal rolls, preferably engraved steel rolls, have a regularly geometrically interrupted surface structure. This applies with particular advantage to the transfer roll ÜW. These surfaces contribute in a particularly advantageous way to the success of the coating process, since anti-adhesive and structured surfaces allow the polyacrylate composition to be transferred even to anti-adhesively treated backing surfaces. Various kinds of anti-adhesive surface coatings can be used for the calender rolls. Among those that have proved to be particularly suitable here are, for example, the aforementioned metal-ceramic-silicone composites Pallas SK-B-012/5 from Pallas Oberflächentechnik GmbH, Germany, and also AST 9984-B from Advanced Surface Technologies, Germany.

The transfer rolls (ÜW) in particular may be designed as engraved steel rolls (cf. variants B—FIG. 3, variant C—FIG. 4 and variant D—FIG. 4 of WO 2006/027387 A1). Used with particular preference as transfer roll ÜW are, for example, engraved steel rolls with the designation 140 L/cm and a flight width of 10 μm, examples being those from Saueressig, Germany.

In the course of coating, particularly when using the multi-roll calenders, it is possible to realize coating speeds of up to 300 m/min.

BRIEF DISCRIPTION OF THE DRAWINGS

Figure 1:
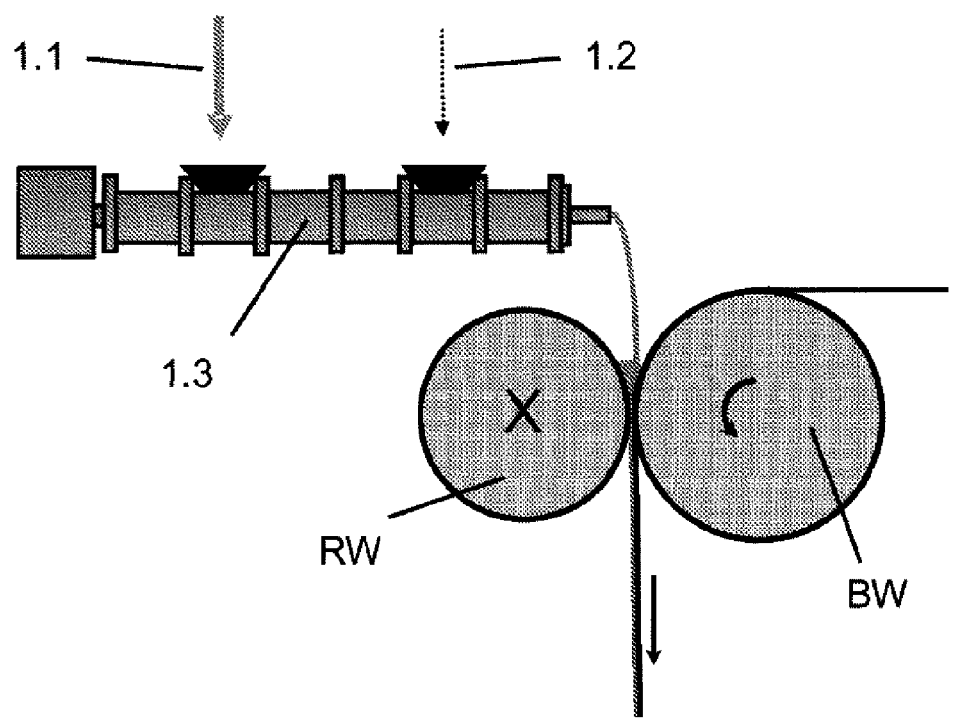
FIG. 1 illustrates a compounding and coating operation in accordance with the invention, on the basis of a continuous process.

Shown by way of example in FIG. 1 of the present specification, without any intention that this should impose any restriction, is the compounding and coating operation, on the basis of a continuous process. The polymers are introduced at the first feed point (1.1) into the compounder (1.3), here for example an extruder. Either the introduction takes place already in the melt, or the polymers are heated in the compounder until the melt state is reached. At the first feed point, together with the polymer, the epoxide-containing compounds are advantageously introduced into the compounder.

Shortly before coating takes place, the accelerators are added at a second feed point (1.2). The outcome of this is that the accelerators are added to the epoxide-containing polymers not until shortly before coating, and the reaction time in the melt is low.

The reaction regime may also be discontinuous. In corresponding compounders such as reactor tanks, for example, the addition of the polymers, the crosslinkers and the accelerators may take place at different times and not, as shown in FIG. 1, at different locations.

Immediately after coating—preferably by means of roller application or by means of an extrusion die—the polymer is only slightly crosslinked, but not yet sufficiently crosslinked. The crosslinking reaction proceeds advantageously on the backing.

After the coating operation, the polymer composition cools down relatively rapidly, in fact to the storage temperature, more generally to room temperature. The crosslinker-accelerator system of the invention is suitable for allowing the crosslinking reaction to continue without the supply of further thermal energy (without heat supply).

The crosslinking reaction between the functional groups of the polyacrylate and the epoxides by means of the crosslinker-accelerator system of the invention proceeds completely, even without heat supply under standard conditions (room temperature). Generally speaking, after a storage time of 5 to 14 days, crosslinking is concluded to a sufficient extent for there to be a functional product present (more particularly an adhesive tape or a functional backing layer on the basis of the polyacrylate). The ultimate state and thus the final cohesion of the polymer are attained, depending on the choice of polymer and of crosslinker-accelerator system, after a storage time of in particular 14 to 100 days, advantageously after 14 to 50 days' storage time at room temperature, and—as expected—earlier at a higher storage temperature.

Crosslinking raises the cohesion of the polymer and hence also the shear strength. The links are very stable. This allows very ageing-stable and heat-resistant products such as adhesive tapes, viscoelastic backing materials or shaped articles.

The physical properties of the end product, especially its viscosity, bond strength and tack, can be influenced through the degree of crosslinking, and so the end product can be optimized through an appropriate choice of the reaction conditions. A variety of factors determine the operational window of this process. The most important influencing variables are the amounts (concentrations and proportions relative to one another) and the chemical natures of the crosslinkers and of the accelerators, the operating temperature and coating temperature, the residence time in compounders (especially extruders) and in the coating assembly, the fraction of functional groups (especially acid groups and/or hydroxyl groups) in the addition polymer, and the average molecular weight of the polyacrylate.

Described below are a number of associations related to the preparation of the inventively crosslinked self-adhesive composition, which more closely characterize the preparation process but are not intended to be restrictive for the concept of the invention.

The process of the invention offers the advantage, in an outstanding and unexpected way, that a stable crosslinking process for polyacrylates can be offered, and one with outstanding control facility in relation to the crosslinking pattern, by virtue of substantial decoupling of degree of crosslinking and reactivity (reaction kinetics). The amount of crosslinker added (amount of epoxide) largely influences the degree of crosslinking of the product; the accelerator largely controls the reactivity.

Surprisingly, it has been observed that, through the amount of epoxide-containing substances added, it was possible to preselect the degree of crosslinking, and to do so largely independently of the otherwise selected process parameters of temperature and amount of added accelerator.

Figure 2:
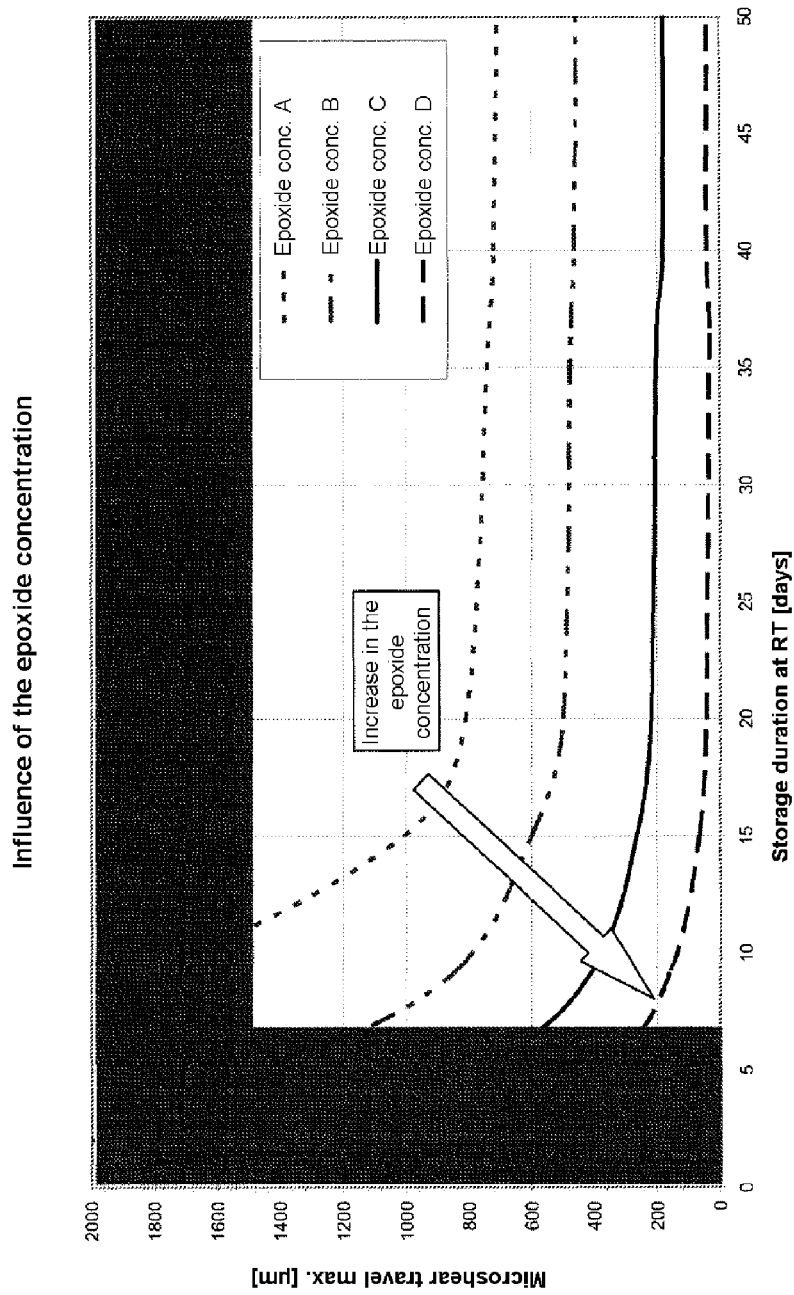
FIG. 2 illustrates schematically the influence of the epoxide group concentration on the degree of crosslinking with constant accelerator amount and temperature.

FIG. 2 shows schematically the influence of the epoxide group concentration on the degree of crosslinking with constant accelerator amount and temperature. Here the accelerator concentration of concentration A (upper curve; low concentration) goes up above concentrations B (second-lowest concentration) and C (second-highest concentration) to concentration D (lower curve; highest concentration). As is evident, the ultimate value of the degree of crosslinking—shown here by decreasing values for the microshear value—goes up as the epoxide concentration increases, while the reaction kinetics remain virtually unaffected.

Additionally it has been observed that the amount of accelerator added had a direct influence on the crosslinking rate, including thus the time at which the ultimate degree of crosslinking was achieved, but without influencing this absolutely. The reactivity of the crosslinking reaction can be selected such that the crosslinking, during the storage of the completed product as well, under the conditions customary therein (room temperature), leads within a few weeks to the desired degree of crosslinking, in particular without it being necessary additionally to supply thermal energy (actively) or for the product to be treated further.

Figure 3:
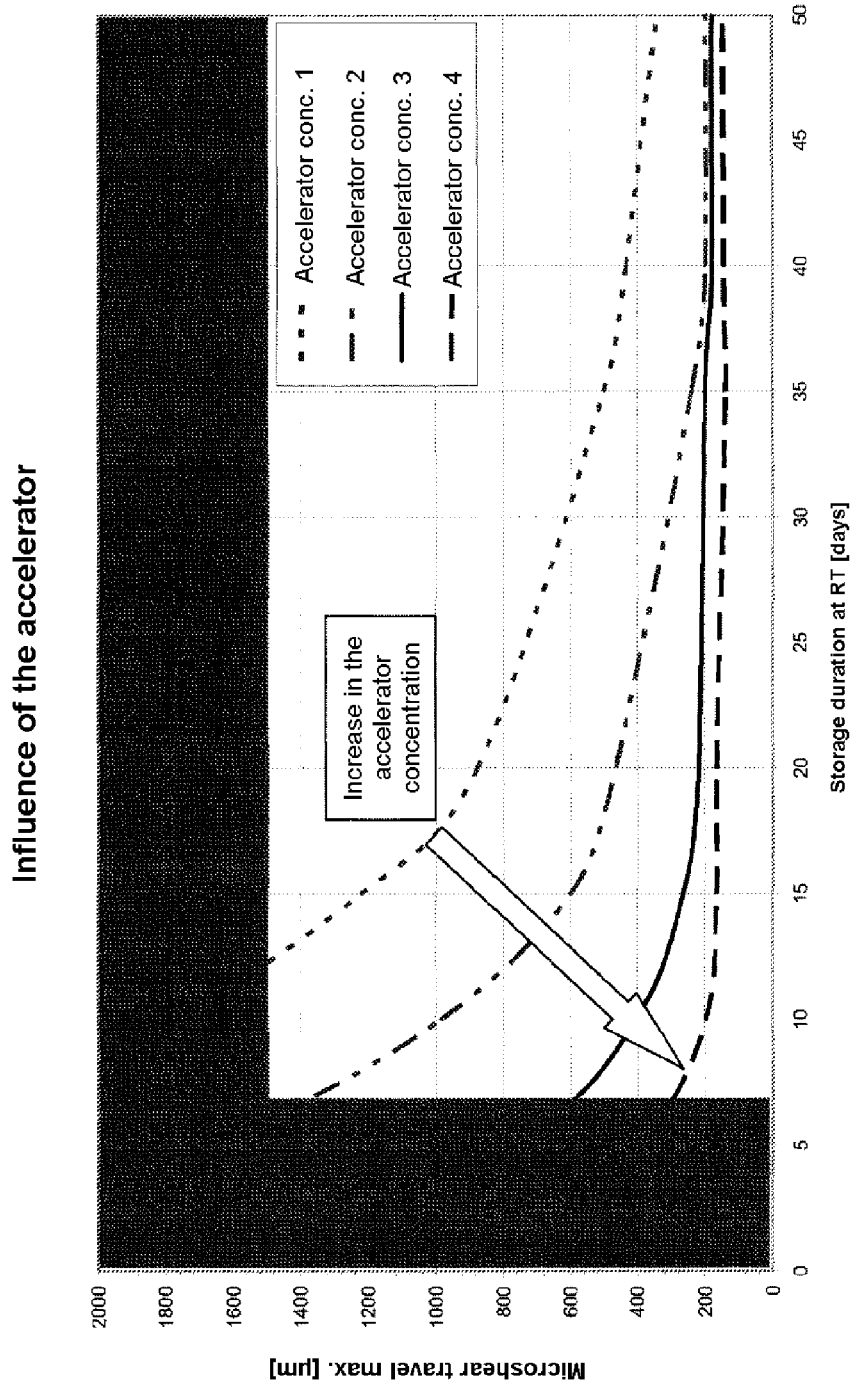
FIG. 3 illustrates the dependency of the crosslinking time at constant temperature.
Figure 4:
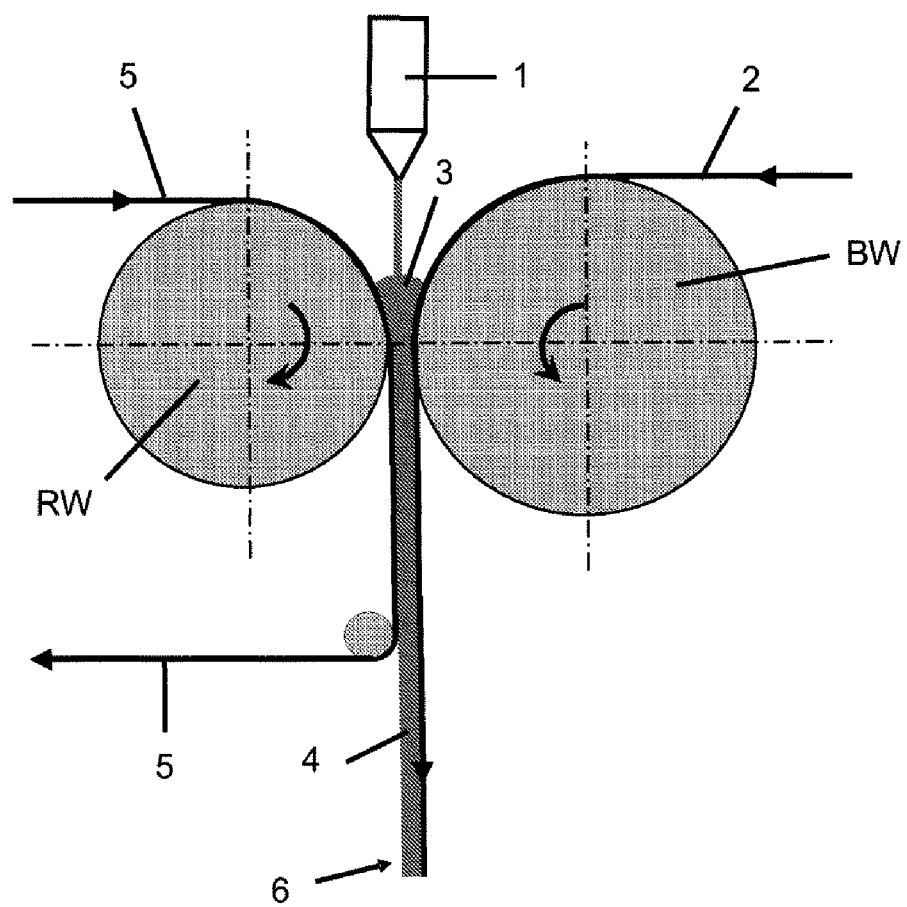
FIG. 4 illustrates the production of a 2-layer construction using a 2-roll calender

The dependency of the crosslinking time at constant temperature (here room temperature) and constant epoxide amount is reproduced schematically in FIG. 3. Here the accelerator concentration of concentration 1 (upper curve; low concentration) goes up above concentrations 2 (second-lowest concentration) and 3 (second-highest concentration) to concentration 4 (lower curve; highest concentration). Here it is found that the ultimate value of the degree of crosslinking remains virtually constant (in the case of very slight reaction this value is not yet achieved); at high accelerator concentrations, however, this value is achieved more quickly than at low accelerator concentrations.

In addition to the aforementioned parameters, the reactivity of the crosslinking reaction can also be influenced by varying the temperature, if desired, especially in those cases where the advantage of "inherent crosslinking" in the course of storage under standard conditions has no part to play. At constant crosslinker concentration, an increase in the operating temperature leads to a reduced viscosity, which enhances the coatability of the composition but reduces the processing life.

An increase in the processing life is acquired by a reduction in the accelerator concentration, reduction in molecular weight, reduction in the concentration of functional groups in the addition polymer, reduction of the acid fraction in the addition polymer, use of less-reactive crosslinkers (epoxides) or of less-reactive crosslinker-accelerator systems, and reduction in operating temperature.

An improvement in the cohesion of the composition can be obtained by a variety of pathways. In one, the accelerator concentration is increased, which reduces the processing life. At constant accelerator concentration, it also possible to raise the molecular weight of the polyacrylate, which is possibly more efficient. In the sense of the invention it is advantageous in any case to raise the concentration of crosslinker (substances containing epoxide groups). Depending on the desired requirements profile of the composition or of the product it is necessary to adapt the above-mentioned parameters in a suitable way.

Advantageous Applications

The inventively prepared polyacrylates can be used for a broad range of applications. Below, a number of particularly advantageous fields of use are set out by way of example.

The polyacrylate prepared by the process of the invention is used in particular as a pressure-sensitive adhesive (PSA), preferably as a PSA for an adhesive tape, where the acrylate PSA is in the form of a single-sided or double-sided film on a backing sheet. These polyacrylates are especially suitable when a high adhesive coat weight is required, since with this coating technique it is possible to achieve an almost arbitrarily high coat weight, preferably more than $100 \text{ g/m}^2$, more preferably more than $200 \text{ g/m}^2$, and to do so in particular at the same time as particularly homogeneous crosslinking through the coat. Examples of favourable applications, without claim to completeness, are technical adhesive tapes, more especially for use in construction, examples being insulating tapes, corrosion control tapes, adhesive aluminium tapes, fabric-reinforced film-backed adhesive tapes (duct tapes), special-purpose adhesive construction tapes, such as vapour barriers, adhesive assembly tapes, cable wrapping tapes, self-adhesive sheets and/or paper labels.

The inventively prepared polyacrylate may also be made available as a PSA for an unbacked adhesive tape, in the form of what is called an adhesive transfer tape. Here as well, the possibility of setting the coat weight almost arbitrarily high in conjunction with particularly homogeneous crosslinking through the coat is a particular advantage. Preferred weights per unit area are more than $10 \text{ g/m}^2$ to $5000 \text{ g/m}^2$, more preferably $100 \text{ g/m}^2$ to $3000 \text{ g/m}^2$.

The inventively prepared polyacrylate may also be present in the form of a heat-sealing adhesive in adhesive transfer tapes or single-sided or double-sided adhesive tapes. Here as well, for backed pressure-sensitive adhesive tapes, the backing may be an inventively obtained viscoelastic polyacrylate.

One advantageous embodiment of the adhesive tapes obtained accordingly can be used in an advantageous way as a strippable adhesive tape, more particularly a tape which can be detached again without residue by pulling substantially in the plane of the bond.

The process of the invention is also particularly suitable for producing three-dimensional shaped articles, whether they be tacky or not. A particular advantage of this process is that there is no restriction on the layer thickness of the polyacrylate to be crosslinked and shaped, in contrast to UV and EBC curing processes. In accordance with the choice of coating assemblies or shaping assemblies, therefore, it is possible to produce structures of any desired shape, which are then able to continue crosslinking to desired strength under mild conditions.

This process is also particularly suitable for the production of particularly thick layers, especially of pressure-sensitive adhesive layers or viscoelastic acrylate layers, with a thickness of more than 80 µm. Layers of this kind are difficult to produce with the solvent technology (bubble formation, very slow coating speed, lamination of thin layers one over another is complicated and harbours weak points).

Thick pressure-sensitive adhesive layers may be present, for example, in unfilled form, as straight acrylate, or in resin-blended form or in a form filled with organic or inorganic fillers. Also possible are layers foamed to a closed-cell or open-cell form in accordance with the known techniques. One possible method of foaming is that of foaming via compressed gases such as nitrogen or $CO_2$, or else foaming via expandants such as hydrazines or expandable microballoons. Where expandable microballoons are used, the composition or the shaped layer is advantageously activated suitably by means of heat introduction. Foaming may take place in the extruder or after coating. It may be judicious to smooth the foamed layer by means of suitable rollers or release films. To produce foam-analogous layers it is also possible to add hollow glass beads or pre-expanded polymeric microballoons to the tacky, thermally crosslinked, pressure-sensitive acrylate hotmelt adhesive.

In particular it is possible, using this process, to produce thick layers as well, which can be used as a backing layer for double-sidedly PSA-coated adhesive tapes, with particular preference filled and foamed layers which can be utilized as backing layers for foamlike adhesive tapes. With these layers as well it is sensible to add hollow glass beads, solid glass beads or expanding microballoons to the polyacrylate prior to the addition of the crosslinker-accelerator system or of the crosslinker or of the accelerator. Where expanding microballoons are used, the composition or the shaped layer is suitably activated by means of heat introduction. Foaming can take place in the extruder or after the coating operation. It can be judicious to smooth the foamed layer by suitable rolls or release films, or by the lamination of a PSA coated onto a release material. It is possible to laminate a pressure-sensitive adhesive layer onto at least one side of a foamlike viscoelastic layer of this kind. It is preferred to laminate a corona-pretreated polyacrylate layer on both sides. Alternatively it is possible to use differently pretreated adhesive layers, i.e. pressure-sensitive adhesive layers and/or heat-activable layers based on polymers other than on acrylates, onto the viscoelastic layer. Suitable base polymers are adhesives based on natural rubber, synthetic rubbers, acrylate block copolymers, styrene block copolymers, EVA, certain polyolefins, specific polyurethanes, polyvinyl ethers, and silicones. Preferred compositions, however, are those which have no significant fraction of migratable constituents whose compatibility with the polyacrylate is so good that they diffuse in significant quantities into the acrylate layer and alter the properties therein.

Instead of laminating a pressure-sensitive adhesive layer onto both sides, it is also possible on at least one side to use a hotmelt-adhesive layer or thermally activable adhesive layer. Asymmetric adhesive tapes of this kind allow the bonding of critical substrates with a high bonding strength. An adhesive tape of this kind can be used, for example, to affix EPDM rubber profiles to vehicles.

One particular advantage of the thermally crosslinked polyacrylates is that these layers, whether utilized as a viscoelastic backing, as a pressure-sensitive adhesive or as a heat-sealing composition, combine an equal surface quality with no crosslinking profile through the layer (or, correspondingly, the shaped articles produced from polyacrylates) in particular in contrast to UV-crosslinked and EBC-crosslinked layers. As a result it is possible for the balance between adhesive and cohesive properties to be controlled and set ideally for the layer as a whole through the crosslinking. In the case of radiation-chemically crosslinked layers, in contrast, there is always one side or one sublayer which is over- or undercrosslinked.

EXPERIMENTAL SECTION

The following exemplary experiments are intended to illustrate the invention, but the choice of examples indicated is not intended to subject the invention to any unnecessary restriction.
Measurement Methods (General):
Solids Content (Measurement Method A1):

The solids content is a measure of the fraction of non-evaporable constituents in a polymer solution. It is determined gravimetrically, by weighing the solution, then evaporating the evaporable fractions in a drying oven at 120° C. for 2 hours and reweighing the residue.
K Value (According to Fikentscher) (Measurement Method A2):

The K value is a measure of the average molecular size of high-polymer materials. It is measured by preparing one percent strength (1 g/100 ml) toluenic polymer solutions and determining their kinematic viscosities using a Vogel-Ossag viscometer. Standardization to the viscosity of the toluene gives the relative viscosity, from which the K value can be calculated by the method of Fikentscher (Polymer 8/1967, 381 ff.)
Gel Permeation Chromatography GPC (Measurement Method A3):

The figures for the weight-average molecular weight $M_w$ and the polydispersity PD in this specification relate to the determination by gel permeation chromatography. Determination is made on a 100 µl sample subjected to clarifying filtration (sample concentration 4 g/l. The eluent used is tetrahydrofuran with 0.1% by volume of trifluoroacetic acid. Measurement takes place at 25° C. The preliminary column used is a column type PSS-SDV, 5 µ, $10^3$ Å, ID 8.0 mm×50 mm. Separation is carried out using the columns of type PSS-SDV, 5 µ, $10^3$ Å and also $10^5$ Å and $10^6$ Å each with ID 8.0 mm×300 mm (columns from Polymer Standards Service; detection by means of Shodex RI71 differential refractometer). The flow rate is 1.0 ml per minute. Calibration takes place against PMMA standards (polymethyl methacrylate calibration).
Measurement Methods (PSAs in Particular):
180° Bond Strength Test (Measurement Method H1):

A strip 20 mm wide of an acrylate PSA applied to polyester as a layer was applied to steel plates which beforehand had been washed twice with acetone and once with isopropanol. The pressure-sensitive adhesive strip was pressed onto the substrate twice with an applied pressure corresponding to a weight of 2 kg. The adhesive tape was then removed from the substrate immediately with a speed of 300 mm/min and at an angle of 180°. All measurements were conducted at room temperature.

The results are reported in N/cm and have been averaged from three measurements. The bond strength to polyethylene (PE) was determined analogously.
Holding Power (Measurement Method H2):

A strip of the adhesive tape 13 mm wide and more than 20 mm long (30 mm, for example) was applied to a smooth steel surface which had been cleaned three times with acetone and once with isopropanol. The bond area was 20 mm*13 mm (length*width), the adhesive tape protruding beyond the test plate at the edge (by 10 mm, for example, corresponding to aforementioned length of 30 mm). Subsequently the adhesive tape was pressed onto the steel support four times, with an applied pressure corresponding to a weight of 2 kg. This sample was suspended vertically, with the protruding end of the adhesive tape pointing downwards.

At room temperature, a weight of 1 kg was affixed to the protruding end of the adhesive tape. Measurement is conducted under standard conditions (23° C., 55% humidity) and at 70° C. in a thermal cabinet.

The holding power times measured (times taken for the adhesive tape to detach completely from the substrate; measurement terminated at 10 000 min) are reported in minutes and correspond to the average value from three measurements.
Microshear Test (Measurement Method H3):

This test serves for the accelerated testing of the shear strength of adhesive tapes under temperature load.
Sample Preparation for Microshear Test:

An adhesive tape (length about 50 mm, width 10 mm) cut from the respective sample specimen is adhered to a steel test plate, which has been cleaned with acetone, in such a way that the steel plate protrudes beyond the adhesive tape to the right and the left, and that the adhesive tape protrudes beyond the test plate by 2 mm at the top edge. The bond area of the sample in terms of height×width=13 mm×10 mm. The bond site is subsequently rolled over six times with a 2 kg steel roller at a speed of 10 m/min. The adhesive tape is reinforced flush with a stable adhesive strip which serves as a support for the travel sensor. The sample is suspended vertically by means of the test plate.
Microshear Test:

The sample specimen for measurement is loaded at the bottom end with a weight of 100 g. The test temperature is 40° C., the test duration 30 minutes (15 minutes' loading and 15 minutes' unloading). The shear travel after the predetermined test duration at constant temperature is report as the result in µm, as both the maximum value ["max"; maximum shear travel as a result of 15-minute loading]; and the minimum value ["min"; shear travel ("residual deflection") 15 minutes after unloading; on unloading there is a backward movement as a result of relaxation]. Likewise reported is the elastic component in percent ["elast"; elastic fraction=(max−min)*100/max].

Measurement Methods (Three-layer Constructions in Particular):

90° Bond Strength to Steel—Open and Lined Side (Measurement Method V1):

The bond strength to steel is determined under test conditions of 23° C.+/−1° C. temperature and 50%+/−5% relative humidity. The specimens were cut to a width of 20 mm and adhered to a steel plate. Prior to the measurement the steel plate is cleaned and conditioned. For this purpose the plate is first wiped down with acetone and then left to stand in the air for 5 minutes to allow the solvent to evaporate. The side of the three-layer assembly facing away from the test substrate was then lined with a 50 μm aluminium foil, thereby preventing the sample from expanding in the course of the measurement. This was followed by the rolling of the test specimen onto the steel substrate. For this purpose the tape was rolled over 5 times back and forth, with a rolling speed of 10 m/min, using a 2 kg roller. Immediately after the rolling-on operation, the steel plate was inserted into a special mount which allows the specimen to be removed at an angle of 90° vertically upwards. The measurement of bond strength was made using a Zwick tensile testing machine. When the lined side is applied to the steel plate, the open side of the three-layer assembly is first laminated to the 50 μm aluminium foil, the release material is removed, and the system is adhered to the steel plate, and subjected to analogous rolling-on and measurement.

The results measured on both sides, open and lined, are reported in N/cm and are averaged from three measurements.

Holding Power—Open and Lined Side (Measurement Method V2):

Speciment preparation took place under test conditions of 23° C.+/−1° C. temperature and 50%+/−5% relative humidity. The test specimen was cut to 13 mm and adhered to a steel plate. The bond area was 20 mm×13 mm (length×width). Prior to the measurement, the steel plate was cleaned and conditioned. For this purpose the plate was first wiped down with acetone and then left to stand in the air for 5 minutes to allow the solvent to evaporate. After bonding had taken place, the open side was reinforced with a 50 μm aluminium foil and rolled over back and forth 2 times using a 2 kg roller. Subsequently a belt loop was attached to the protruding end of the three-layer assembly. The whole system was then suspended from a suitable device and subjected to a load of 10N. The suspension device is such that the weight loads the sample at an angle of 179°+/−1°. This ensures that the three-layer assembly is unable to peel from the bottom edge of the plate. The measured holding power, the time between suspension and dropping of the sample, is reported in minutes and corresponds to the average value from three measurements. To measure the lined side, the open side is first reinforced with the 50 μm aluminium foil, the release material is removed, and adhesion to the test plate takes place as described. The measurement is conducted under standard conditions (23° C., 55% relative humidity).

Figure 6:
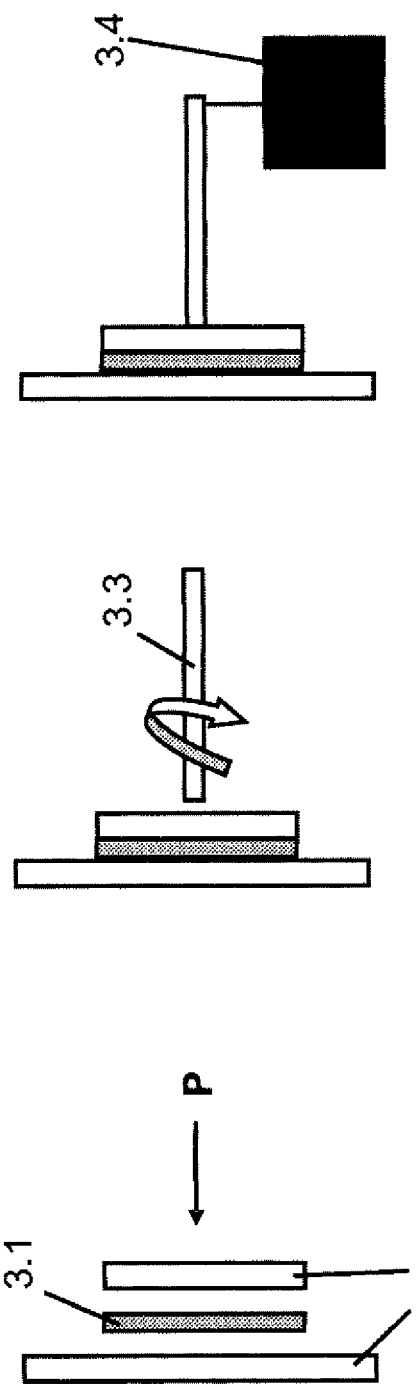
FIG. 6 illustrates the production of the pressure-sensitive polyacrylate layers (layer A and/or C).

Wall Hook Test (Measurement Method V3):

FIG. 6 shows the production of the pressure-sensitive polyacrylate layers (layer A and/or C). A test specimen (3.1) measuring 30 mm×30 mm and fixed between two polished steel plates (3.2) is subjected to a pressure of 0.9 kN (force P) for 1 minute. Thereafter a lever arm (3.3) 9 cm long is screwed into the uppermost steel plate, and is then loaded with a 1000 g weight (3.4). Care is taken to ensure that the time between application of pressure and loading is not more than two minutes (t≤2 min).

A measurement is made of the holding time, i.e. the time between the suspension and the dropping of the specimen. The result reported is the holding time in minutes as the average from a triplicate determination. The test conditions are 23° C.+/−1° C. and 50% rh+/−5% rh (rh is relative humidity).

Measurements were made in each case of the open side and of the lined side.

Commercially Available Chemicals Used

| Chemical compound | Trade name | Manufacturer | CAS No. |
|---|---|---|---|
| Bis(4-tert-butylcyclohexyl)peroxydicarbonate | Perkadox ® 16 | Akzo Nobel | 15520-11-3 |
| Terpene-phenolic-based tackifier resin (softening point 110° C., hydroxyl value 45-60) | Dertophene ® T110 | DRT, France | 73597-48-5 |
| Pentaerythritol tetraglycidyl ether | Polypox ® R16 | UPPC AG | 3126-63-4 |
| Triethylenetetramine | Epikure ® 3234 Epikure ® 925 | Hexion Speciality Chemicals | 112-24-3 |
| Isopropylated triaryl phosphate | Reofos ® 65 | Great Lakes, USA | 68937-41-7 |
| Diethylenetriamine | Epikure ® 3223 | Hexion Speciality Chemicals | 111-40-0 |
| Trimethylolpropane triglycidyl ether | Polypox ® R20 | UPPC AG | 30499-70-8 |
| Trimethylhexamethylenediamine | Epikure ® 940 | Hexion Speciality Chemicals | 25620-58-0 |
| 2,2'-Azobis(2-methylpropionitrile), AIBN | Vazo ® 64 | DuPont | 78-67-1 |
| Hollow glass beads (density 0.28 g/cm$^3$; bulk density 0.16 g/cm$^3$, particle diameter 5-115 μm [range]; 65 μm [average value]) | Q-Cel ® Hollow Glass Spheres 5028 | Potters Industries | |
| Chalk (density 2.74 g/cm$^3$, bulk density 0.56 g/cm$^3$, pH value 8.8-9.5, solubility [water] 16 mg/l, decomposition point 900° C.) | Mikrosöhl ® 40 | Vereinigte Kreidewerke Dammann kg | 1317-65-3 |

-continued

| Chemical compound | Trade name | Manufacturer | CAS No. |
|---|---|---|---|
| Thermoplastic hollow microbeads (particle size 10-17 μm; density max. 0.017 g/cm$^3$; expansion temperature 127-139° C. [start]; 164-184° C. [max. Exp.]) | Expancel ® 092 DU 40 | Akzo Nobel | | all specification figures at 20° C.;
Epikure ® also marketed under the trade names Epi-Cure ® and Bakelite ® EPH Pressure-sensitive Adhesive (PSA) Examples
Preparation of Starting Polymers for Examples PSA B1 to B8

Described below is the preparation of the starting polymers. The polymers investigated are prepared conventionally via free radical addition polymerization in solution.

Base Polymer P1

A reactor conventional for free-radical polymerizations was charged with 45 kg of 2-ethylhexyl acrylate, 45 kg of n-butyl acrylate, 5 kg of methyl acrylate, 5 kg of acrylic acid and 66 kg of acetone/isopropanol (92.5:7.5). After nitrogen gas had been passed through the reactor for 45 minutes with stirring, the reactor was heated to 58° C. and 50 g of AIBN were added. Subsequently the external heating bath was heated to 75° C. and the reaction was carried out constantly at this external temperature. After 1 h a further 50 g of AIBN were added, and after 4 h the batch was diluted with 20 kg of acetone/isopropanol mixture.

After 5 h and again after 7 h, reinitiation took place with 150 g of bis(4-tert-butylcyclohexyl) peroxydicarbonate in each case. After a reaction time of 22 h the polymerization was terminated and the batch was cooled to room temperature. The polyacrylate has a conversion of 99.6%, a K value of 59, a solids content of 54%, an average molecular weight of Mw=557 000 g/mol, polydispersity PD (Mw/Mn)=7.6.

Base Polymer P2

A reactor conventional for free-radical polymerizations was charged with 47.5 kg of 2-ethylhexyl acrylate, 47.5 kg of n-butyl acrylate, 5 kg of acrylic acid, 150 g of dibenzoyl trithiocarbonate and 66 kg of acetone. After nitrogen gas had been passed through the reactor for 45 minutes with stirring, the reactor was heated to 58° C. and 50 g of AIBN were added. Subsequently the external heating bath was heated to 75° C. and the reaction was carried out constantly at this external temperature. After 1 h a further 50 g of AIBN were added. After 4 h the batch was diluted with 10 kg of acetone. After 5 h and again after 7 h, reinitiation took place with 150 g of bis(4-tert-butylcyclohexyl) peroxydicarbonate in each case. After a reaction time of 22 h the polymerization was terminated and the batch was cooled to room temperature.

The polyacrylate has a conversion of 99.5%, a K value of 41.9, a solids content of 56.5%, an average molecular weight of Mw=367 000 g/mol, polydispersity PD (Mw/Mn)=2.8.

Base Polymer P3

In the same way as in Example P1, 41.5 kg of 2-ethylhexyl acrylate, 41.5 kg of n-butyl acrylate, 15 kg of methyl acrylate, 1 kg of acrylic acid and 1 kg of 2-hydroxyethyl methacrylate (HEMA) were polymerized in 66 kg of acetone/isopropanol (92.5:7.5). Initiation was carried out twice with 50 g of AIBN in each case, twice with 150 g of bis(4-tert-butylcyclohexyl) peroxydicarbonate in each case, and dilution was carried out with 20 kg of acetone/isopropanol mixture (92.5:7.5). After a reaction time of 22 h the polymerization was terminated and the batch was cooled to room temperature. The polyacrylate has a conversion of 99.6%, a K value of 69.5, a solids content of 53.3%, an average molecular weight of Mw=689 000 g/mol, polydispersity PD (Mw/Mn)=7.8.

Base Polymer P4

In the same way as in Example P1, 68 kg of 2-ethylhexyl acrylate, 25 kg of methyl acrylate and 7 kg of acrylic acid were polymerized in 66 kg of acetone/isopropanol (92.5:7.5).

The polyacrylate has a conversion of 99.7%, a K value of 51, a solids content of 55.0%, an average molecular weight of Mw=657 000 g/mol, polydispersity PD (Mw/Mn)=8.2.

Process 1: Concentration/Preparation of the Hotmelt PSAs:

The acrylate copolymers (base polymers P1 to P4) are very largely freed from the solvent by means of a single-screw extruder (concentrating extruder, Berstorff GmbH, Germany) (residual solvent content 0.3% by weight; cf. the individual examples). The parameters given here by way of example are those for the concentration of base polymer P1. The screw speed was 150 rpm, the motor current 15 A, and a throughput of 58.0 kg liquid/h was realized. For concentration, a vacuum was applied at 3 different domes. The reduced pressures were, respectively, between 20 mbar and 300 mbar. The exit temperature of the concentrated hotmelt is approximately 115° C. The solids content after this concentration step was 99.8%.

Process 2: Preparation of the Modified Hotmelt PSAs and Viscoelastic Backings

The acrylate hotmelt PSA prepared in accordance with Process 1 as elucidated above were conveyed directly into a downstream Welding twin-screw extruder (Welding Engineers, Orlando, USA; model 30 mm DWD; screw diameter 30 mm, length of screw 1=1258 mm; length of screw 2=1081 mm; 3 zones). Via a solids metering system, the resin Dertophene® T110 was metered in zone 1 and mixed in homogeneously. In the case of the composition for Examples MT 1 and MP 2, no resin was metered in. In the case of Examples MT 3, MT 4 and MT 5, the corresponding adjuvants were metered in via the solids metering system and were mixed in homogeneously. The parameters given here by way of example are those for resin compounding with base polymer P1. Speed was 451 rpm, the motor current 42 A, and a throughput of 30.1 kg/h was realized. The temperatures of zones 1 and 2 were each 105° C., the melt temperature in zone 1 was 117° C., and the composition temperature on exit (zone 3) was 100° C.

Process 3: Production of the Inventive Adhesive Tapes, Blending with the Crosslinker-accelerator System for Thermal Crosslinking, and Coating The acrylate hotmelt PSAs prepared by Processes 1-2 were melted in a feeder extruder (single-screw conveying extruder from Troester GmbH & Co. KG, Germany) and using this extruder were conveyed as a polymer melt into a twin-screw extruder (Leistritz, Germany, ref. LSM 30/34). The assembly is heated electrically from the outside and is air-cooled by a number of fans, and is designed such that, with effective distribution of the crosslinker-accelerator system in the polymer matrix, there is at the same time a short residence time ensured for the adhesive in the extruder. For this purpose the mixing shafts of the twin-screw extruder were arranged in such a way that conveying elements are in alternation with mixing elements. The addition of the respective crosslinkers and accelerators is made with suitable metering equipment, where appropriate at two or more points (FIG. 1: metering points 1.1 and 1.2) and, where appropriate, with the use of metering assistants into the unpressurized conveying zones of the twin-screw extruder. Following exit of the ready-compounded adhesive, i.e. of the adhesive blended with the crosslinker-accelerator system, from the twin-screw extruder (exit: circular die, 5 mm diameter), coating takes place in accordance with FIG. 1 onto a backing material in web form.

The time between metered addition of the crosslinker-accelerator system and the shaping or coating procedure is termed the processing life. The processing life indicates the period within which the adhesive, blended with the crosslinker-accelerator system, or the viscoelastic backing layer, can be coated with a visually good appearance (gel-free, speck-free). Coating takes place with web speeds between 1 m/min and 20 m/min; the doctor roll of the 2-roll applicator is not driven.

In the examples below and in Tables 1 to 3, the formulations employed, the production parameters and the properties obtained are each described in more detail.

Example B1

The base polymer P1 is polymerized in accordance with the polymerization process described, concentrated in accordance with Process 1 (solids content 99.8%) and then blended with Dertophene® T110 resin in accordance with Process 2. This resin-modified acrylate hotmelt composition was then compounded in accordance with Process 3 continuously with the crosslinker-accelerator system consisting of a pentaerythritol tetraglycidyl ether,
in this case Polypox® R16 from UPPC AG, Germany (epoxide)

and a triethylenetetramine,
in this case Epikure® 3234 from Hexion, Germany (amine accelerator).

Detailed description: In the twin-screw extruder described in Process 3, a total mass flow consisting of 70 parts of polymer P1 and 30 parts of Dertophene® T110 resin of 533.3 g/min (corresponding to 373 grams of the pure polymer per minute) was blended with 1.14 g/min of the epoxide crosslinker pentaerythritol tetraglycidyl ether (corresponding to 0.31% by weight based on polymer) and with 1.89 g/min of the amine accelerator triethylenetetramine (corresponding to 0.51% by weight based on polymer). The amine and the epoxide were metered separately via two peristaltic pumps at metering point 1.1 (see FIG. 1). To improve meterability and the quality of mixing achievable, the crosslinker system used was diluted with the liquid phosphate ester (isopropylated triaryl phosphate; Reofos 65; Great Lakes, USA) (ratio to the crosslinker 0.5:1). The operational parameters are summarized in Table 2.

The processing life of the completed compounded formulation was more than 7 minutes with an average composition temperature of 125° C. after departure from the Leistritz twin-screw extruder. Coating takes place on a 2-roll applicator in accordance with FIG. 1, at roll surface temperatures of 100° C. in each case and with a coat weight of 86 g/m² onto 23 µm PET film. On the adhesive tape thus produced, measurements were made of the bond strength to steel at room temperature and microshear travel at 40° C. as a function of the storage time. After 25 days of room-temperature storage, the maximum microshear travel is measured at 160 µm, with an elastic fraction of 75%. Further technical adhesive data of Example B1 are summarized in Table 3. This example shows that very high-performance adhesive tapes can be produced, featuring, among other qualities, high bond strengths to polar and apolar substrates (steel and polyethylene) and good cohesive properties even under the influence of temperature.

Example B2

The base polymer P2, concentrated by Process 1 and blended by Process 2 with Dertophene® T110 resin (residual solvent fraction: 0.1% by weight) was compounded by Process 3 in a twin-screw extruder with the crosslinker-accelerator system, and coated, in the same way as in Example B1.

The crosslinker-accelerator system is composed of trimethylolpropane triglycidyl ether,
in this case Polypox® R20 from UPPC AG, Germany (epoxide)

and diethylenetriamine,
in this case Epikure® 3223 from Hexion, Germany (amine accelerator).

In the same way as in Example B1, 0.87% by weight of the polyfunctional epoxide trimethylolpropane triglycidyl ether and 0.48% by weight of the amine diethylenetriamine (in each based on acrylate copolymer) were added by Process 3. The extruder speed of the Leistritz twin-screw extruder was 125 revolutions per minute, the mass throughput 16.4 kg/h. The processing life was more than 5 minutes for an effective composition temperature of 108° C. following departure from the extruder. By means of the roll-applicator in accordance with FIG. 1, coating took place with a coat weight of 101 g/m² onto 23 µm PET film.

On the adhesive tape thus produced, measurements were carried out of bond strength, holding power and microshear travel as a function of the storage time of the specimens at room temperature. After 25 days of room-temperature storage, holding powers of more than 10 000 minutes at room temperature were measured. This adhesive tape specimen was highly crosslinked, as evident from the very low maximum shear travel of only 70 µm and from a high elastic fraction of 90% in accordance with "microshear travel" measurement method H3. The bond strength to polyethlyene (PE) is, at 2.5 N/cm, low in accordance with expectation. Further technical adhesive data are listed in Table 3 under Example B2.

Example B3

The polymerization of the polymer P3 used, the concentration, resin blending and incorporation of the crosslinker-accelerator system, and coating, take place essentially as described in Example 1.

The crosslinking system used in this case is composed of pentaerythritol tetraglycidyl ether,
in this case Polypox® R16 from UPPC AG, Germany and trimethylhexamethylenediamine,
in this case Epikure® 940 from Hexion, Germany.

In the same way as in Example B1, 0.35% by weight of the polyfunctional epoxide pentaerythritol tetraglycidyl ether and 0.30% by weight of the amine trimethylhexamethylenediamine (in each case based on acrylate copolymer) were added. This polymer system used, relative to Examples B1 and B2, contains less acrylic acid, has a higher K value of 69.5, and is formulated more moderately in terms of the cohesive properties, the holding powers of 23° C. and 70° C.

The holding powers at 23° C. are 1600 min. Further details of figures specific to the composition are found in Table 1.

Example B4

The polymerization of polymer P3 used, concentration, resin blending and the incorporation of the crosslinker-accelerator system, and coating, take place essentially as described in Example 1. Contrastingly, in Process 2, the chalk filler Mikrosöhl® 40 was incorporated as well, for which the mixing-screw geometries of the twin-screw extruder used were adapted accordingly. The crosslinker-accelerator system used here was selected as in Example P3. 0.45% by weight of the polyfunctional epoxide pentaerythritol tetraglycidyl ether and 0.40% by weight of the amine trimethylhexamethylenediamine were added (in each case based on acrylate copolymer).

The average composition temperature after exit from the compounding extruder rose from 110° C. to 117° C. relative to the composition system from Example B3. Not only the measured bond strengths, at 9.4, but also the holding powers, at 3800 min, are improved relative to Example B3.

Further details of figures specific to the composition are found in Table 1, of operational parameters set in Table 2, and of technical adhesive results in Table 3, in each case in row B4.

Example B5

The base polymer P4 concentrated by Process 1 (residual solvent fraction: 0.15% by weight) was compounded by Process 3 in the twin-screw extruder with the crosslinker-accelerator system, and coated, in the same way as in Example B1.

The crosslinker-accelerator system is composed of
trimethylolpropane triglycidyl ether,
in this case Polypox® R20 from UPPC AG, Germany (epoxide)
and
diethylenetriamines,
in this case Epikure® 3223 from Hexion, Germany (amine accelerator).

In the same way as in Example B1, 0.78% by weight of the polyfunctional epoxide trimethylolpropane triglycidyl ether and 0.48% by weight of the amine diethylenetriamine (in each case based on acrylate copolymer) were added by Process 3. The extruder speed of the Leistritz twin-screw extruder was 100 revolutions per minute, the mass throughput 10 kg/h. The processing life was more than 5 minutes for an effective composition temperature of 114° C. after departure from the extruder. By means of the two-roll applicator in accordance with FIG. 1, coating took place with a coat weight of 125 g/m² onto 23 μm PET film.

Example B6 (Comparative Example)

The polymerization of polymer P1 used, concentration, resin blending, the incorporation of the crosslinker component, and coating take place essentially as described in Example 1, but with the following variation:

The crosslinking system used here is composed of
pentaerythritol tetraglycidyl ether,
in this case Polypox® R16 from UPPC AG, Germany
and
zinc chloride.

0.79% by weight of the polyfunctional epoxide pentaerythritol tetraglycidyl ether and 0.43% by weight of zinc chloride were added.

The shear travel measured in accordance with "microshear travel" measurement method H3, after 25 days of storage at room temperature, is found to be more than 2000 μm, the elastic fraction 0%, meaning that no crosslinking, or no significant crosslinking, has taken place.

Repetition of the Measurements after Temperature Storage:

This adhesive tape specimen undergoes crosslinking neither after 6-day storage at 60° C. nor after one-hour storage at 140° C. in a thermal cabinet. The adhesive tape specimens were measured again, after these storage conditions, with the "microshear travel" measurement method H3, and the shear travel was again found to be more than 2000 μm.

In view of the absence of crosslinking, no further technical adhesive tests are performed. Further details of figures specific to the composition are found in Table 1, and further details of the operational parameters set are found in Table 2, in each case in row B6.

Example B7 (Comparative Example)

The polymerization of polymer P1 used, concentration, resin blending, the incorporation of the crosslinker component, and coating take place essentially as described in Example 1, but with the following variation:

The crosslinking system used here is composed only of
triethylenetetramine,
in this case Epikure® 3234 from Hexion, Germany.
In this example no epoxide is used.

0.50% by weight of the polyfunctional amine triethylenetetramine was added.

The shear travel measured in accordance with "microshear travel" measurement method H3, after 25 days of storage at room temperature, is found to be more than 2000 μm, the elastic fraction 0%, meaning that no crosslinking, or no significant crosslinking, has taken place.

Repetition of the Measurements after Temperature Storage:

This adhesive tape specimen undergoes crosslinking neither after 3-month storage at 70° C. nor after one-hour storage at 140° C. in a thermal cabinet. Measurement was carried out again after this storage with the "microshear travel" measurement method H3, and the shear travel was found to be more than 2000 μm. In view of the absence of crosslinking, no further technical adhesive tests are performed.

Further details of figures specific to the composition are found in Table 1, and further details of the operational parameters set are found in Table 2, in each case in row B7.

Example B8 (Comparative Example)

The polymerization of polymer P1 used, concentration, resin blending, the incorporation of the crosslinker component, and coating take place essentially as described in Example 1, but with the following variation:

The crosslinking system used here is composed only of
pentaerythritol tetraglycidyl ether
in this case Polypox® R16 from UPPC AG, Germany.

0.31% by weight, based on polymer, of the polyfunctional epoxide pentaerythritol tetraglycidyl ether was added.

In this example no amine is used.

The shear travel measured in accordance with "microshear travel" measurement method H3, after 25 days of storage at room temperature, is found to be more than 2000 μm, the elastic fraction 0%, meaning that no crosslinking, or no significant crosslinking, has taken place.

Repetition of the Measurements after Temperature Storage:

This adhesive tape specimen undergoes crosslinking neither after 3-month storage at 70° C. nor after one-hour storage at 140° C. in a thermal cabinet. Measurement was carried out again after this storage with the "microshear travel" measurement method H3, and the shear travel was in each case found to be more than 2000 µm. In view of the absence of crosslinking, no further technical adhesive tests are performed. Further details of figures specific to the composition are found in Table 1, and further details of the operational parameters set are found in Table 2, in each case in row B8.

Where the crosslinker-accelerator system of the invention is used, the crosslinking reaction via the functional groups of the polyacrylate proceeds completely, even without supply of heat, under standard conditions (room temperature). In general, after a storage time of 5 days to 14 days, the crosslinking reaction has concluded to an extent sufficient to give a functional adhesive tape or functional backing layer. The final crosslinking state and hence the ultimate cohesion of the composition is achieved, depending on the choice of composition/crosslinker system, after storage for 14 to 100 days, in advantageous form after 14 to 50 days of storage time at room temperature; if the storage temperature is higher, these conditions are reached earlier, as expected.

The crosslinking increases the cohesion of the adhesive and hence also the shear strength. These groups are known to be very stable. This permits very ageing-stable and heat-resistant self-adhesive tapes.

In contrast it is apparent from viewing the Comparative Examples, B6 to B8, that crosslinking is unsuccessful if the crosslinker-accelerator system of the invention is not used.

Viscoelastic Backing and Three-layer Construction Examples

I. Preparation of the Pressure-sensitive Adhesive
Polyacrylate PSA 1 (PA1):

A 100 l glass reactor conventional for free-radical polymerizations was charged with 2.8 kg of acrylic acid, 8.0 kg of methyl acrylate, 29.2 kg of 2-ethylhexyl acrylate and 20.0 kg of acetone/isopropanol (95:5). After nitrogen gas had been passed through the reactor for 45 minutes with stirring, the reactor was heated to 58° C. and 20 g of AIBN were added. Subsequently the external heating bath was heated to 75° C. and the reaction was carried out constantly at this external temperature. After a reaction time of 1 h a further 20 g of AIBN were added. After 4 h and again after 8 h, the batch was diluted with 10.0 kg of acetone/isopropanol (95:5) mixture in each case. For reduction of the residual initiators, 60 g portions of bis(4-tert-butylcyclohexyl) peroxydicarbonate were added in each case after 8 h and again after 10 h. After a reaction time of 24 h the reaction was terminated and the batch was cooled to room temperature. Subsequently the polyacrylate was blended with 0.4% by weight of aluminium (III) acetylacetonate (3% strength solution in isopropanol), diluted to a solids content of 30% with isopropanol and then coated from solution onto a siliconized release film (50 µm polyester). (Coating speed 2.5 m/min, drying tunnel 15 m, temperatures zone 1: 40° C., zone 2: 70° C., zone 3: 95° C., zone 4: 105° C.) the coat weight was 50 g/m².

II. Production of the Viscoelastic Backings
Preparation of the Starting Polymers for the Viscoelastic Backings of Examples VT 1 to 5

Described below is the preparation of the starting polymers. The polymers investigated are prepared conventionally via free radical addition polymerization in solution.

Base polymer HPT 1

A reactor conventional for free-radical polymerizations was charged with 40 kg of 2-ethylhexyl acrylate, 40 kg of n-butyl acrylate, 15 kg of methyl acrylate, 5 kg of acrylic acid and 67 kg of acetone/isopropanol (95:5). After nitrogen gas had been passed through the reactor for 45 minutes with stirring, the reactor was heated to 58° C. and 40 g of AIBN were added. Subsequently the external heating bath was heated to 75° C. and the reaction was carried out constantly at this external temperature. After 1 h a further 60 g of AIBN were added, and after 4 h the batch was diluted with 14 kg of acetone/isopropanol mixture.

After 5 h and again after 7 h, reinitiation took place with 150 g of bis(4-tert-butylcyclohexyl) peroxydicarbonate in each case. After a reaction time of 22 h polymerization was terminated and the batch was cooled to room temperature. The polyacrylate has a K value of 57, a solids content of 54.6%, an average molecular weight of Mw=714 000 g/mol, polydispersity PD (Mw/Mn)=7.6.

Base Polymer HPT 2

In the same way as in Example 1, 65 kg of 2-ethylhexyl acrylate, 30 kg of tert-butyl acrylate and 5 kg of acrylic acid were polymerized in 67 kg of acetone/isopropanol (95:5). Initiation took place twice with 50 g of AIBN in each case, twice with 150 g of bis(4-tert-butylcyclohexyl) peroxydicarbonate in each case, and dilution took place with 20 kg of acetone/isopropanol mixture (95:5). After a reaction time of 22 h the polymerization was terminated and the batch was cooled to room temperature.

The polyacrylate has a K value of 61.0, a solids content of 53.2%, an average molecular weight of Mw=697 000 g/mol, polydispersity PD (Mw/Mn)=7.1.

Base Polymer HPT 3

The procedure adopted was similar to that in Example 1. For the polymerization, 60 kg of 2-ethylhexyl acrylate, 30 kg of styrene, 5 kg of methyl acrylate and 5 kg of acrylic acid were polymerized in 25 kg of ethyl acetate/isopropanol (97:3). Initiation took place twice with 50 g of AIBN in each case, twice with 150 g of bis(4-tert-butylcyclohexyl) peroxydicarbonate in each case (after reaction times of 36 h and 44 h), and dilution took place with 20 kg of ethyl acetate/isopropanol mixture (97:3). After a reaction time of 48 h the polymerization was terminated and the batch was cooled to room temperature. The polyacrylate has a K value of 61, a solids content of 68.4%, an average molecular weight of Mw=567 000 g/mol, polydispersity PD (Mw/Mn)=11.8.

Base Polymer HPT 4

A reactor conventional for free-radical polymerizations was charged with 65 kg of 2-ethylhexyl acrylate, 30 kg of tert-butyl acrylate, 5 kg of acrylic acid, 100 g of benzyl dithiobenzoate and 67 kg of acetone. After nitrogen gas had been passed through the reactor for 45 minutes with stirring, the reactor was heated to 58° C. and 50 g of AIBN were added. Subsequently the external heating bath was heated to 75° C. and the reaction was carried out constantly at this external temperature. After 1 h a further 50 g of AIBN were added, and after 4 h the batch was diluted with 10 kg of acetone. After 5 h and again after 7 h, an addition was made of 150 g of bis(4-tert-butylcyclohexyl) peroxydicarbonate in each case. After a reaction time of 22 h polymerization was terminated and the batch was cooled to room temperature.

The polyacrylate has a K value of 49.2, a solids content of 59.2%, an average molecular weight of Mw=379 000 g/mol, polydispersity PD (Mw/Mn)=3.1.

Base Polymer HPT 5

A reactor conventional for free-radical polymerizations was charged with 68 kg of 2-ethylhexyl acrylate, 25 kg of methyl acrylate, 7 kg of acrylic acid and 66 kg of acetone/isopropanol (95:5). After nitrogen gas had been passed through the reactor for 45 minutes with stirring, the reactor was heated to 58° C. and 40 g of AIBN were added. Subsequently the external heating bath was heated to 75° C. and the reaction was carried out constantly at this external temperature. After 1 h a further 60 g of AIBN were added, and after 4 h the batch was diluted with 20 kg of acetone/isopropanol (95:5). After 5 h and again after 7 h, an addition was made of 150 g of bis(4-tert-butylcyclohexyl) peroxydicarbonate in each case. After a reaction time of 22 h polymerization was terminated and the batch was cooled to room temperature.

The polyacrylate has a K value of 55, a solids content of 55%, an average molecular weight of Mw=579 000 g/mol, polydispersity PD (Mw/Mn)=7.9.

Concentration and Compounding of Base Polymers HPT 1-5 for the Viscoelastic Backings:

The acrylate copolymers HPT 1-5 are freed from the solvents in accordance with Process 1 and where appropriate are subsequently admixed by Process 2 with additives; cf. the individual examples.

Process 4: Production of the 3-layer Constructions by Means of 2-Roll Calender

Figure 5:
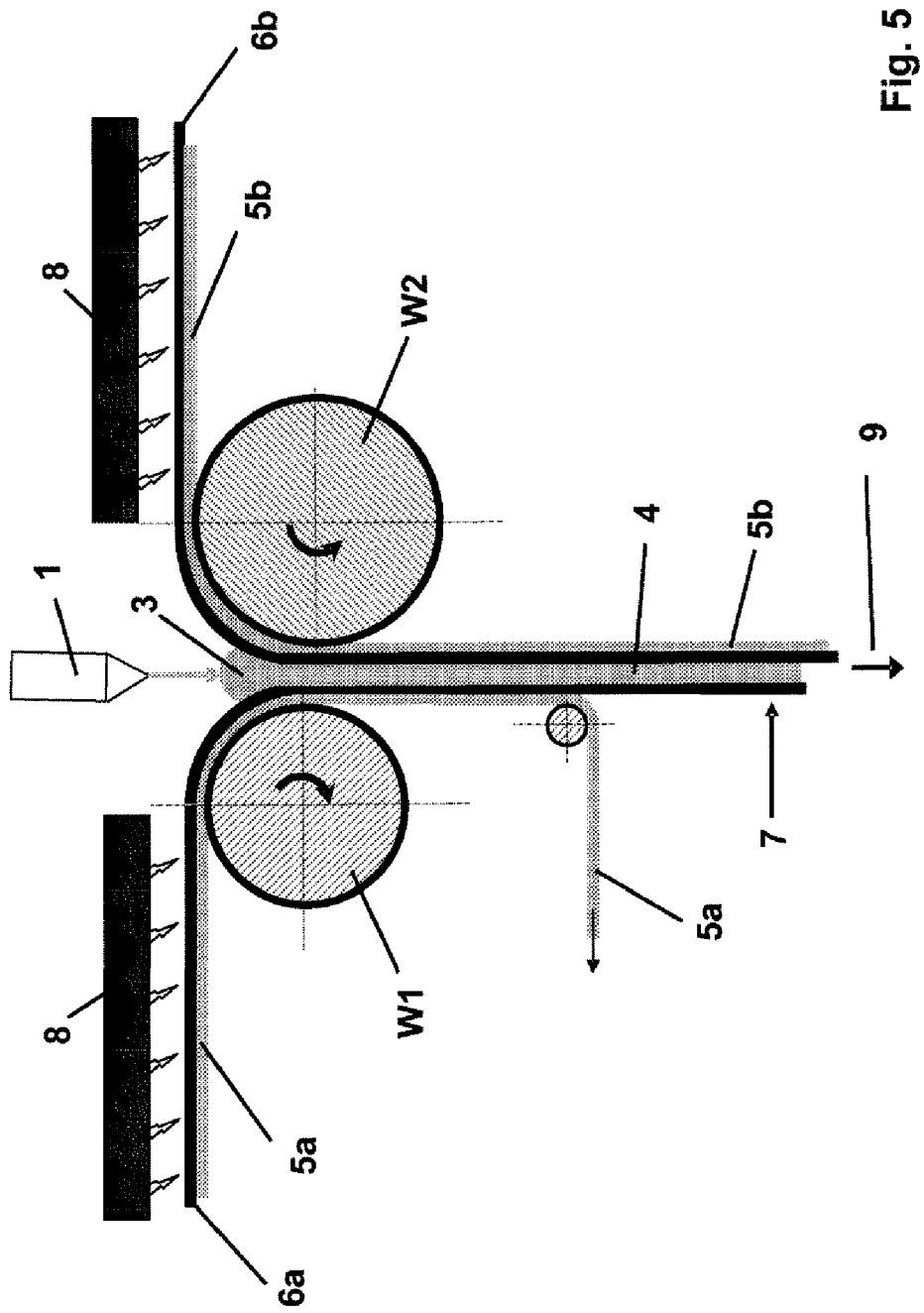
FIG. 5 illustrates the production of a 3-layer construction using a 2-roll calender

The process was carried out as described in FIG. 5. Using a manifold die (1), the viscoelastic composition (3), already compounded with the crosslinker-accelerator system and, where appropriate, fillers, is supplied to the roll nip. The shaping of the viscoelastic composition to a viscoelastic film takes place between the calender rolls (W1) and (W2) in the roll nip between two self-adhesive compositions (6a, 6b), which in turn are supplied coated onto anti-adhesively treated backing materials (5a, 5b). In this case there is, simultaneously, shaping of the viscoelastic composition to the set layer thickness, and coating with the two supplied self-adhesive compositions. In order to improve the anchoring of the self-adhesive compositions (6a, 6b) on the shaped viscoelastic backing layer (4), the self-adhesive compositions, before being supplied to the roll nip, are corona-treated by means of a corona station (8) (corona unit from Vitaphone, Denmark, 100 W·min/m$^2$). As a result of this treatment, following the production of the three-layer assembly, there is improved chemical attachment to the viscoelastic backing layer.

The web speed on passing through the coating unit is 30 m/min.

Following departure from the roll nip, an anti-adhesive backing (5a) is lined if appropriate, and the completed three-layer product (9) is wound up with the remaining second anti-adhesive backing (5b).

Presented below are specific examples relating to the preparation of the self-adhesive compositions and the coating of the adhesive tapes of the invention, without any intention that the invention should be unnecessarily restricted by the choice of formulations, configurations and operational parameters specified.

Example MT 1

The base polymer HPT1 was concentrated by Process 1 (solids content 99.7%) and then compounded by Process 3 in a twin-screw extruder continuously with the crosslinker-accelerator system composed of trimethylolpropane triglycidyl ether (Polypox® R20; 0.48% by weight based on the polyacrylate) and diethylenetriamine (Epikure® 3223; 0.40% by weight based on the polyacrylate).

Coating to produce the viscoelastic backing VT1 from the base polymer HPT1 between the composition layers PA 1, coated beforehand onto siliconized polyester films, takes place on a 2-roll applicator at roll temperatures of 100° C. by Process 4. The layer thickness of the viscoelastic backing VT 1 was 800 μm. The corona power was 100 W·min/m$^2$. After 7 days of room-temperature storage, the technical adhesive data were measured for both the open and the lined sides. The data of Example MT 1 are summarized in Table 4.

Example MT 2

The base polymer HPT2 was concentrated by Process 1 (solids content 99.8%) and then compounded by Process 3 in a twin-screw extruder continuously with the crosslinker-accelerator system composed of trimethylolpropane triglycidyl ether (Polypox® R20; 0.56% by weight based on the polyacrylate) and diethylenetriamine (Epikure® 3223; 0.40% by weight based on the polyacrylate). Subsequently, in the same way as in Example 1, coating took place between composition layers PA 1, in each case coated beforehand onto siliconized polyester films, on a 2-roll applicator by Process 3. The layer thickness of the viscoelastic backing VT 2 was 850 μm. The corona power was 100 W·min/m$^2$. After 7 days of room-temperature storage, the technical adhesive data were measured for both the open and lined sides. The data of Example MT 2 are summarized in Table 4.

Example MT 3

The base polymer HPT3 was concentrated by Process 1 (solids content 99.7%) and then compounded by Process 2 with 6.5% by weight of hollow glass beads Q-CEL® 5028 (Potters Industries) and compounded by Process 3 in a twin-screw extruder continuously with the crosslinker-accelerator system composed of trimethylolpropane triglycidyl ether (Polypox® R20; 0.56% by weight based on the polyacrylate) and diethylenetriamine (Epikure® 3223; 0.80% by weight based on the polyacrylate).

Coating to produce the viscoelastic backing VT3 between the composition layers PA 1, coated beforehand onto siliconized polyester films, takes place on a 2-roll applicator at roll temperatures of 100° C. by Process 3. The layer thickness of the viscoelastic backing VT 3 was 800 μm. The corona power was 100 W·min/m$^2$. After 7 days of room-temperature storage, the technical adhesive data were measured for both the open and the lined sides. The data of Example MT 3 are summarized in Table 4.

Example MT 4

The base polymer HPT4 was concentrated by Process 1 (solids content 99.7%) and then blended by Process 2 with 18% by weight of Mikrosöhl chalk (Mikrosöhl® 40) and compounded by Process 3 in a twin-screw extruder continuously with the crosslinker-accelerator system composed of trimethylolpropane triglycidyl ether (Polypox® R20; 0.34% by weight based on the polyacrylate) and diethylenetriamine (Epikure 3223; 0.42% by weight based on the polyacrylate). Coating to produce the viscoelastic backing VT4 between the composition layers PA 1, coated beforehand onto siliconized polyester films, takes place on a 2-roll applicator at roll temperatures of 100° C. by Process 3. The layer thickness of the viscoelastic backing VT 4 was 800 μm. The corona power was 100 W·min/m$^2$. After 7 days of room-temperature storage, the technical adhesive data were measured for both the open and the lined sides. The data of Example MT 4 are summarized in Table 4.

Example MT 5

The base polymer HPT5 was concentrated by Process 1 (solids content 99.8%) and then blended by Process 2 with 3% by weight of unexpanded hollow microbeads Expancel®

092 DU 40 (Akzo Nobel, Germany) and compounded by Process 3 in a twin-screw extruder continuously with the crosslinker-accelerator system composed of trimethylolpropane triglycidyl ether (Polypox® R20; 0.54% by weight based on the polyacrylate) and diethylenetriamine (Epikure® 3223; 0.42% by weight based on the polyacrylate). Heat was introduced to expand the mixture in the extruder, and then coating between the composition layers PA 1, coated beforehand onto siliconized polyester films, took place at roll temperatures of 130° C. by Process 3. The layer thickness of the expanded viscoelastic backing VT 5 was 800 µm. The corona power for preheating the pressure-sensitive adhesive layers was 100 W·min/m². After 7 days of room-temperature storage, the technical adhesive data were measured for both the open and the lined sides. The data of Example MT 5 are summarized in Table 4.

As is apparent from the data in Table 4, the inventively double-sidedly adhesive assembly tapes have very good technical adhesive data. A particularly positive feature is the balanced bonding profile of each of the sides. For a given layer of adhesive on both sides of the adhesive tape, these sides give virtually the same technical adhesive data. This shows the homogeneous crosslinking through the layer. This is surprising for the person skilled in the art. Moreover, these three-layer adhesive tapes do not exhibit delamination. The anchoring of the layers to one another is very good by virtue of the corona treatment of the pressure-sensitive adhesive layers and the after-crosslinking of the adjacent viscoelastic backing layer.

TABLE 1

Composition-specific figures

| | | | | Ingredients and amounts | |
|---|---|---|---|---|---|
| Example | Base polymer | K value [ ] | Compounding by Process 2 Polymer and adjuvants | Crosslinker Accelerator | % by weight based on polymer |
| B1 | P1 | 59 | 70 parts polymer P1 + 30 parts resin DT 110 | Polypox ® R16 Epikure ® 3234 | 0.31 0.51 |
| B2 | P2 | 41.9 | 70 parts polymer P2 + 30 parts resin DT 110 | Polypox ® R20 Epikure ® 3223 | 0.87 0.48 |
| B3 | P3 | 69.5 | 70 parts polymer P3 + 30 parts resin DT 110 | Polypox ® R16 Epikure ® 940 | 0.35 0.30 |
| B4 | P3 | 69.5 | 49 parts polymer P3 + 21 parts resin DT 110 + 30 parts Mikrosohl ® 40 chalk | Polypox ® R16 Epikure ® 940 | 0.45 0.40 |
| B5 | P4 | 51 | 100 parts polymer P4 | Polypox ® R20 Epikure ® 3223 | 0.78 0.48 |
| B6 | P1 | 59 | 70 parts polymer P1 + 30 parts resin DT 110 | Polypox ® R16 Zinc chloride | 0.79 0.43 |
| B7 | P1 | 59 | 70 parts polymer P1 + 30 parts resin DT110 | / Epikure ® 3234 | / 0.50 |
| B8 | P1 | 59 | 70 parts polymer P1 + 30 parts resin DT110 | Polypox ® R16 / | 0.31 / |

K value = measurement method A2
DT 110 = Dertophene ® T110

TABLE 2

Operational parameters

| | Base polymer | | | | | Operational parameters | | | | | |
|---|---|---|---|---|---|---|---|---|---|---|---|
| Example [ ] | Polymer [ ] | K value [ ] | Compounding by Process 2 Fraction of adjuvants | Total mass throughput TSE [kg/h] | TSE speed [1/min] | Nominal power consumption TSE [A] | Pressure at exit of TSE [bar] | Temp. of composition after TSE [° C.] | Doctor roll RW | Coating roll BW | Processing life [min] |
| B1 | P1 | 59 | 70 parts polymer P1 + 30 parts resin DT 110 | 32.0 | 110 | 15 | 12 | 125 | 100 | 100 | more than 7 |
| B2 | P2 | 41.9 | 70 parts polymer P2 + 30 parts resin DT 110 | 16.4 | 125 | 7 | 5 | 108 | 100 | 100 | more than 5 |
| B3 | P3 | 69.5 | 70 parts polymer P3 + 30 parts resin DT 110 | 12.0 | 110 | 8 | 10 | 110 | 100 | 100 | more than 5 |
| B4 | P3 | 69.5 | 49 parts polymer P3 + 21 parts resin DT 110 + 30 parts Mikrosohl ® 40 chalk | 16.0 | 120 | 10 | 15 | 117 | 100 | 100 | more than 7 |
| B5 | P4 | 51 | Polymer P4 | 10.0 | 100 | 14 | 20 | 114 | 100 | 100 | more than 5 |
| B6 | P1 | 59 | 70 parts polymer P1 + 30 parts resin DT 110 | 15.0 | 100 | 9 | 11 | 111 | 100 | 100 | more than 10 |

TABLE 2-continued

Operational parameters

| Example [ ] | Base polymer Polymer [ ] | K value [ ] | Compounding by Process 2 Fraction of adjuvants | Total mass throughput TSE [kg/h] | TSE speed [1/min] | Nominal power consumption TSE [A] | Pressure at exit of TSE [bar] | Temp. of composition after TSE [° C.] | Doctor roll RW | Coating roll BW | Processing life [min] |
|---|---|---|---|---|---|---|---|---|---|---|---|
| B7 | P1 | 59 | 70 parts polymer P1 + 30 parts resin DT 110 | 16.0 | 100 | 11 | 10 | 118 | 100 | 100 | more than 10 |
| B8 | P1 | 59 | 70 parts polymer P1 + 30 parts resin DT 110 | 15.0 | 100 | 9 | 8 | 115 | 100 | 100 | more than 10 |

TSE = twin-screw extruder;
DT 110 = Dertophene ® T110

TABLE 3

Technical adhesive results

Technical adhesive properties after storage of specimens for 25 days at room temperature

| Example [ ] | Base polymer Polymer [ ] | K value [ ] | Compounding Process 2 Fraction of adjuvants | Backing film [ ] | Coat weight [g/m²] | Bond strength to steel [N/cm] | Bond strength to PE [N/cm] | Holding power 10 N, 23° C. [min] | Holding power 10 N, 70° C. [min] | MST 40° C./ elast. fraction [μm]/[%] |
|---|---|---|---|---|---|---|---|---|---|---|
| B1 | P1 | 59 | 70 parts polymer P1 + 30 parts resin DT 110 | 23 μm PET film | 86 | 9.8 | 4.6 | >10 000 | 80 | 160/75 |
| B2 | P2 | 41.9 | 70 parts polymer P2 + 30 parts resin DT 110 | 23 μm PET film | 101 | 8.5 | 2.5 | >10 000 | 30 | 70/90 |
| B3 | P3 | 69.5 | 70 parts polymer P3 + 30 parts resin DT 110 | 23 μm PET film | 79 | 8.1 | 3.4 | 1600 | 15 | 512/67 |
| B4 | P3 | 69.5 | 49 parts polymer P3 + 21 parts resin DT 110 + 30 parts Mikrosöhl ® 40 chalk | 23 μm PET film | 98 | 9.4 | 2.9 | 3800 | 28 | 430/73 |
| B5 | P4 | 51 | only polymer P4 | 23 μm PET film | 125 | 8.6 | 2.5 | 10 000 | 5670 | 960/79 |
| B6 | P1 | 59 | 70 parts polymer P1 + 30 parts resin DT 110 | 23 μm PET film | 105 | Tests not possible, formulation has not crosslinked. | | | | more than 2000/0 |
| B7 | P1 | 59 | 70 parts polymer P1 + 30 parts resin DT 110 | 23 μm PET film | 75 | Tests not possible, formulation has not crosslinked. | | | | more than 2000/0 |
| B8 | P1 | 59 | 70 parts polymer P1 + 30 parts resin DT 110 | 23 μm PET film | 81 | Tests not possible, formulation has not crosslinked. | | | | more than 2000/0 |

Bond strength steel/PE = measurement method H1
Holding power = measurement method H2
MST = Microshear travel = measurement method H3
DT 110 = Dertophene ® T110

TABLE 4

Product construction and technical adhesive data of the three-layer constructions

| Example | Three-layer product PSA 1 | Visco-elastic backing layer | PSA 2 | Backing thickness [μm] | Bond strength for steel [N/cm] open side | lined side | Holding power 10 N 23° C. [min] open side | lined side | Wall hoot test [min] open side | lined side | MST 40° C./ elast. fraction [μm]/[%] |
|---|---|---|---|---|---|---|---|---|---|---|---|
| MT 1 | 50 g/m² PA 1 | VT 1 | 50 g/m² PA 1 | 800 | 14.2 | 13.7 | >10 000 | >10 000 | 2580 | 2795 | 950/76 |

TABLE 4-continued

Product construction and technical adhesive data of the three-layer constructions

| | Three-layer product | | | Backing thickness [μm] | Bond strength for steel [N/cm] | | Holding power 10 N 23° C. [min] | | Wall hook test [min] | | MST 40° C./ elast. fraction [μm]/[%] |
| | PSA 1 | Viscoelastic backing layer | PSA 2 | | open side | lined side | open side | lined side | open side | lined side | |
|---|---|---|---|---|---|---|---|---|---|---|---|
| Example | | | | | | | | | | | |
| MT 2 | 50 g/m² PA 1 | VT 2 | 50 g/m² PA 1 | 850 | 11.8 | 11.6 | 7850 | 6970 | 4876 | 4456 | 877/78 |
| MT 3 | 50 g/m² PA 1 | VT 3 | 50 g/m² PA 1 | 800 | 13.7 | 14.2 | >10 000 | >10 000 | 9320 | 9360 | 546/69 |
| MT 4 | 50 g/m² PA 1 | VT 4 | 50 g/m² PA 1 | 800 | 10.7 | 10.6 | >10 000 | >10 000 | 7540 | 7468 | 738/75 |
| MT 5 | 50 g/m² PA 1 | VT 5 | 50 g/m² PA 1 | 800 | 13.5 | 13.6 | >10 000 | >10 000 | >10 000 | >10 000 | 1067/78 |

Bond strength steel = measurement method V1
Holding power = measurement method V2
Wall hook test = measurement method V3

The invention claimed is:

1. A polyacrylate melt comprising a crosslinker-accelerator system for the thermal crosslinking of polyacrylates with functional groups capable of entering into linking reactions with epoxide groups, comprising at least one substance containing epoxide groups, in an amount of 0.1 to 5% by weight of the polyacrylate, and at least one substance which has an accelerating effect for the linking reaction at about room temperature.

2. The polyacrylate melt of claim 1, wherein said at least one substance which has an accelerator action for the linking reaction at about room temperature is at least one amine.

3. The polyacrylate melt of claim 2, wherein said at least one amine is at least one tertiary amine.

4. The polyacrylate melt of claim 2, wherein said at least one amine is at least one polyfunctional amine.

5. The polyacrylate melt of claim 1, wherein said at least one substance which has an accelerator action for the linking reaction at about room temperature is at least one phosphine or at least one phosphonium compound.

6. The polyacrylate melt of claim 1, wherein said at least one substance containing epoxide groups is at least one polyfunctional epoxide.

7. The polyacrylate melt of claim 1, wherein said at least one substance containing epoxide groups is at least one substance containing two epoxide groups.

8. Process for thermal crosslinking in the melt of polyacrylates with functional groups capable of entering into linking reactions with epoxide groups, wherein said thermal crosslinking is carried out in the melt in the presence of a crosslinker-accelerator system comprising substances containing epoxide groups, in an amount of 0.1 to 5% by weight of polyacrylate, and at least one substance which has an accelerator action for the linking reaction at about room temperature.

9. Process according to claim 8, wherein said crosslinker-accelerator system is at least polyfunctional epoxide and at least one amine, at least one phosphine or at least one phosphonium compound.

10. Process according to claim 8, wherein the functional groups of the polyacrylates are selected from the group consisting of carboxyl groups, hydroxyl groups, acid anhydride groups, sulphonic acid groups and phosphonic acid groups.

11. Process according to claim 8, wherein the crosslinking is initiated in the melt of the polyacrylate in the presence of the crosslinker-accelerator system, which is thereafter cooled at a point in time at which the crosslinking reaction has been concluded to an extent of less than 10%.

12. Process according to claim 11, wherein the cooling is to essentially room temperature.

13. Process according to claim 8, wherein the thermal crosslinking is initiated in a processing reactor, the polyacrylate is removed from the processing reactor after initiation and is coated onto a permanent or temporary backing, and the polyacrylate is cooled to essentially room temperature in the course of coating or immediately after coating.

* * * * *